(12) United States Patent
Vinck et al.

(10) Patent No.: US 9,296,182 B2
(45) Date of Patent: Mar. 29, 2016

(54) COEXTRUSION PROCESSES FOR MAKING MULTILAYER FILMS AND FILMS MADE THEREBY

(75) Inventors: Michael Jan Vinck, Lebbeke (BE);
Marc Desire Tierens, Meise (BE);
Stefan Bertil Ohlsson, Haacht (BE);
Mario Bastiaens, Haacht (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 1048 days.

(21) Appl. No.: 12/302,211

(22) PCT Filed: Jun. 8, 2007

(86) PCT No.: PCT/EP2007/005090
§ 371 (c)(1),
(2), (4) Date: Nov. 24, 2008

(87) PCT Pub. No.: WO2007/141036
PCT Pub. Date: Dec. 13, 2007

(65) Prior Publication Data
US 2009/0110913 A1    Apr. 30, 2009

(30) Foreign Application Priority Data

Jun. 9, 2006  (GB) .................................. 0611331.0

(51) Int. Cl.
*B32B 27/32*  (2006.01)
*B29C 47/00*  (2006.01)
(Continued)

(52) U.S. Cl.
CPC ............... *B32B 27/32* (2013.01); *B29C 47/009* (2013.01); *B29C 47/0026* (2013.01);
(Continued)

(58) Field of Classification Search
None
See application file for complete search history.

(56) References Cited

U.S. PATENT DOCUMENTS

| 4,518,654 A | 5/1985 | Eichbauer et al. |
| 5,008,204 A | 4/1991 | Stehling |

(Continued)

FOREIGN PATENT DOCUMENTS

| EP | 1529633 | 6/2006 |
| WO | WO 93/03093 | 2/1993 |

(Continued)

OTHER PUBLICATIONS

"Rheological Measurments" *"Encyclopedia of Polymer Science and Engineering"* vol. 14 published by John Wiley and Sons 1988. p. 458.

(Continued)

*Primary Examiner* — Monica Huson
(74) *Attorney, Agent, or Firm* — Kristina Leavitt; Leandro Arechederra, III; Frank E. Reid

(57) ABSTRACT

The invention relates to a blown film coextrusion process. The process involves extruding core contact layers through a die exit at a specified speed and cooling, orienting and crystallizing the multi-layer film formed at a specified deformation rate to form a the frost line is a specified distance from the die exit by withdrawing film at a take up speed. The core and core contact layers are of a film forming polymer composition comprising at least 90 wt % of ethylene based polymer. The ethylene based polymer of the core layer has an average density of ethylene based polymers equal to or higher than that of ethylene based polymer of the core contact layers. The invention specifically concerns the feature that the core layer composition contains a portion of and the composition of the core contact layers contains a portion of a linear polyethylene so as to make the core layer more resistant to deformation than the skin layers.

8 Claims, 4 Drawing Sheets

(51) Int. Cl.
 *B29C 47/06* (2006.01)
 *B29K 23/00* (2006.01)

(52) U.S. Cl.
 CPC ........ *B29C 47/065* (2013.01); *B29C 2791/007* (2013.01); *B29K 2023/0625* (2013.01); *B29K 2023/0633* (2013.01); *B29K 2023/083* (2013.01); *Y10T 428/263* (2015.01)

(56) References Cited

U.S. PATENT DOCUMENTS

| | | | |
|---|---|---|---|
| 5,248,547 A | 9/1993 | Wilson | |
| 5,261,536 A | 11/1993 | Wilson | |
| 5,431,284 A | 7/1995 | Wilson | |
| 5,922,441 A | 7/1999 | Eichbauer | |
| 6,093,480 A | 7/2000 | Eichbauer | |
| 6,214,469 B1 | 4/2001 | Sukhadia et al. | |
| 6,368,545 B1* | 4/2002 | Bailey et al. | 264/514 |
| 6,482,532 B1* | 11/2002 | Yap et al. | 428/516 |
| 6,521,338 B1 | 2/2003 | Maka | |
| 2004/0019155 A1* | 1/2004 | McLeod et al. | 525/333.8 |
| 2004/0048019 A1 | 3/2004 | Ohlsson | |
| 2006/0188678 A1 | 8/2006 | Ohlsson et al. | |

FOREIGN PATENT DOCUMENTS

| | | |
|---|---|---|
| WO | WO 94/25495 | 11/1994 |
| WO | WO 98/44011 | 10/1998 |
| WO | WO 99/07788 | 2/1999 |
| WO | WO 03/040201 | 5/2003 |
| WO | WO 2004/011456 | 2/2004 |
| WO | WO 2004/022646 | 3/2004 |
| WO | WO 2005/014762 | 2/2005 |
| WO | WO 2006/021081 | 3/2006 |

OTHER PUBLICATIONS

"Rheological behavior of reactive blending of epoxidized natural rubber . . . " by C. Nakason et al in the Journal of Applied Polymer Science, vol. 91, 1752-1762, 2003 at p. 1759.

Wild et al., 3. Poly. Sci, Poly. Phys. Ed., vol. 20, p. 441-455 (1982).

"Liquid Chromatography of Polymers and Related Materials III", J. Cazes, editor, Marcel Dekker. 1981, p. 207.

* cited by examiner

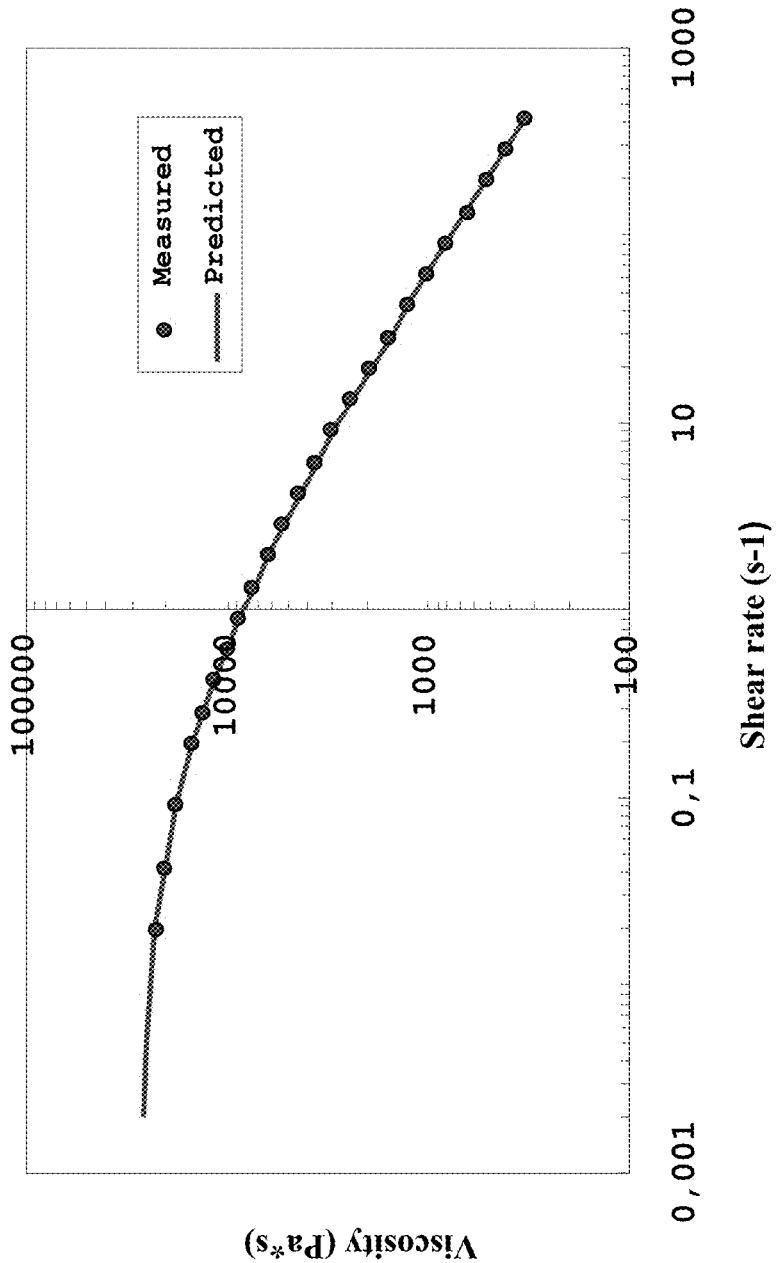

COEXTRUSION PROCESSES FOR MAKING MULTILAYER FILMS AND FILMS MADE THEREBY

CROSS-REFERENCED TO RELATED APPLICATIONS

This application is a National Stage Application of International Application No. PCT/EP2007/005090, filed Jun. 8, 2007, which claims priority to Great Britain Patent Application No. 0611331.0, filed Jun. 9, 2006, both of which are fully incorporated herein by reference.

FIELD OF INVENTION

This invention relates to coextrusion processes for making multi-layer films and films made thereby. The invention relates especially to methods for optimizing the coextrusion process conditions and film opticals as well as to the blown film coextrusion processes themselves and to films produced by such processes. The films produced may have varying end-use properties in terms of thickness, cling, shrinkage, and heat sealability and may be of use in various packaging applications, such as stretch film, shrink film, heat seal film and wrapping film.

BACKGROUND OF INVENTION

This section defines some of the terms used in the description and claims. Whenever a reference is made to these terms, they should be construed in accordance with the following paragraphs.

Types of Polyethylene

Ethylene based polymers are available in many forms including highly branched low density polyethylene (LDPE) and more linear polyethylenes. Each form can make a distinct contribution towards processability and ultimate film properties. LDPE and linear polyethylene are regarded as distinct by people skilled in the art.

To obtain LDPE, ethylene can be polymerized using free-radical initiators under high pressure conditions. The free radicals trigger the incorporation of chain lengths along the length of a main chain so forming long chain branches, usually by what is known as a back-biting mechanism. The branches vary in length and configuration. LDPE can be described as heterogeneously branched. The polymer chains formed differ significantly and the molecular weight distribution as determined by GPC is broad. The average molecular weight can be controlled with a variety of telogens or transfer agents which may incorporate at the chain ends or along the chain. Comonomers may be used such as olefins other than ethylene or minor amounts of olefinically copolymerizable monomers containing polar moieties such a carbonyl group.

LDPE is defined in the specification and claims as a polymer comprising at least 85 mol % of units derived from ethylene which is heterogeneously branched and contains less than 7.5 mol % of units derived from comonomers containing polar moieties such a carbonyl group, including ethylenically unsaturated esters, e.g. vinyl acetate, ethylene methyl acrylate, ethylene methacrylic acid or ethylene acrylic acid.

Other types of ethylene based polymers that are not included in the above LDPE definition include heterogeneously branched ethylene vinyl acetate containing more than 7.5 mol % of comonomer having polar groups.

To obtain the more linear ethylene based polymers, referred to herein as linear polyethylene, catalytic polymerization mechanisms are used. Polymerization may be performed with Ziegler-Natta catalysts comprising generally a transition metal component and in most cases an activator or cocatalyst. Monomers such as ethylene or other olefin comonomers incorporate principally at the end of the polymer chain. Backbiting mechanisms are substantially absent. The molecular weight distribution as measured by GPC Mw/Mn is relatively narrow. Such polymers tend to be more linear and have no or low levels of long chain branches. As used herein in the description and claims, references to non-branched linear polyethylene refer to polymers having an $I_{21.6\ linear\ pe}/I_{2.16\ linear\ pe}$ ratio of less than 30.

If long chain branches are present in measurable amounts, their length and structure is assumed to be similar and linear. They may be referred to as homogeneously branched linear polyethylene. This term as used herein in the description and claims refers to polymers having an $I_{21.6\ linear\ pe}/I_{2.16\ linear\ pe}$ ratio of greater than 35. The molecular weight distribution is narrow relative that that prevalent for LDPE. Because of the sensitivity of the catalysts to poisoning by polar groups, monomers having polar groups cannot be used. The main comonomers are alpha-olefins.

Linear polyethylene is defined in the specification and claims as a polymer comprising at least 65 mol % of ethylene derived units and a balance of units derived from an alpha-olefin having from 3 to 12 carbon atoms which is not branched or, if branched, is homogeneously branched. Generally these polymers have an Mw/Mn as determined by GPC DRI as described herein of less than 4.

Linear polyethylene may be sub-divided into different types depending on their density. The main groups are very low density polyethylene (VLDPE), linear low density polyethylene (LLDPE) and high density polyethylene (HDPE). In the general literature the stated density ranges for these polymers may vary. In the specification and claims, VLDPE is defined as a linear polyethylene having a density of less than 0.91 g/cm$^3$; LLDPE is defined as a linear polyethylene having a density of from 0.91 up to 0.94 g/cm$^3$; and HDPE is defined as a linear polymer having a density of above 0.94 g/cm$^3$.

Linear polyethylene may also be subdivided having regard to the nature of the catalysts system used which influences homogeneity and so the overall properties in processing and properties of the film produced. The prefix "zn" is used in the specification and claims, as in "znLLDPE", to indicate that the catalyst system used titanium as the transition metal component and an aluminum alkyl as cocatalyst. The prefix "m" is used in the specification and claims, as in mLLDPE, to indicate that the transition metal component used was a single site catalyst, which generally refers to a metallocene activated by methods well known for such components, such alumoxane or a non-coordinating anion. "zn" linear polyethylene types tend to have a greater heterogeneity in terms of molecular weight distribution and composition distribution as compared to "m" linear polyethylene types, as may be determined by suitable fractionation techniques appropriate to the density concerned, such as a measurement of the compositional distribution breadth index (CDBI) or a Crystaf measurement.

As used herein in the description and claims "zn" linear polyethylene types refer to polyethylenes, analyzable by elution fractionation, having a CDBI of less than 45% and "m" linear polyethylene types refer to polyethylene having a CDBI of greater than 50%, the CDBI being determined as described in WO93/03093 (U.S. Pat. No. 5,206,075). At low densities other fractionation techniques can be used to separate "zn" and "m" types of linear polyethylene.

Catalytic polymerization mechanisms are also used to produce linear polymers based on other olefins, mostly propylene. Examples include propylene based polymers such as polypropylene homopolymer, random propylene copolymer (RCP) as well as propylene based elastomers (PBE), including those described in WO99/07788 and WO2003/040201 having varying degrees of randomness or blockiness. The term "other linear polyolefin polymers" is used in the specification and claims to refer to other linear polymers generally using a catalytic polymerization mechanism with units derived from one or more olefin monomers, that may or may not be branched, but which exclude linear polyethylene as defined above.

In describing the compositions in the description and claims all percentages by weight are based on the total weight of polymer in the compositions, excluding any other non-polymeric additives, unless otherwise mentioned.

Coextrusion Processes

Films can be extruded by cast extrusion or blown film extrusion. The invention is concerned with blown film extrusion and especially coextrusion. The term coextrusion in the specification and claims refers to an extrusion process where at least two molten polymer compositions are extruded and bonded together in a molten condition in the die exit. Films are formed, while cooling progressively, after a complex interplay of stretching, orientation and crystallization until the film reaches a take up device enclosing the top of the bubble, such as a pair of pinch rollers.

In blown film extrusion the film is pulled upwards by for example pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain defects tend to limit production speed and are largely determined by the polymer rheology including the shear sensitivity which determines the maximum output and the melt tension which limits the bubble stability, BUR and take up speed.

Discussion of Prior Art References:

U.S. Pat. No. 4,518,654A published 21 May 1985 discusses the use of blends of LDPE and linear polyethylene in mono-layer stretch wrap films. The LDPE used in the examples has an MI of 2.0; the deformation rate is not indicated.

U.S. Pat. No. 5,922,441A published 13 Jul. 1999 produces a multi-layer stretch film using a core layer containing LDPE with an MI of 1.9 and 3.3. The deformation rate and haze is not indicated.

US2004/0048019A1 published 11 Mar. 2004 discloses coextruded stretch films (see [0193]) using a blown film process and mLLDPE's. No examples of compositions that are especially selected for use in combination in multi-layer films are disclosed.

US2006/0188678 published 24 Aug. 2006 discloses multi-layer coextruded film made by blown extrusion for use in heavy duty packaging. Clarity is not a major requirement for such use. Table 3 Example 2 discloses a multi-layer film with the core containing 5 wt % of Escorene LD150BW which has an MI of 0.75 and a skin layer containing 9 wt % of the same LD150BW; almost double that in the core layer. Haze is not reported.

WO2004/011456 published 5 Feb. 2004 discloses (see page 7 line 21 onwards) multi-layer shrink films that may be coextruded including blown film extrusion. Examples 2 and 3 disclose the combination of multi-layer films, some of which have an LLDPE in the core and LDPE in the skin. Haze is not reported.

Example 23 in EP1529633 published 11 May 2005 discloses a multi-layer blown coextruded film having a core layer comprising 80 wt % Escorene LD514BA and 20 wt % of an HDPE and two skin layers in contact with the core layer of 95 wt % of an mLLDPE and 5 wt % of the LD514BA. The MI of the LDPE is not indicated. Its replacement by the HDPE is said to lead to reduction in haze.

WO2005/014762 published 17 Feb. 2005 describes multi-layer film for stretch hood application. The examples show skin layers of mLLDPE and a core layer of heterogeneously branched EVA containing less than 2.3 mol % of units derived from vinyl acetate (see Table 1). Information provided is insufficient to determine the frost line height (FLH) and diameter at the FLH location and does not disclose the deformation rate.

WO2004/022646 published 18 Mar. 2004 describes shrink films including multilayer films (see [0010] and [0095]). LDPE for the core layer may have a broad range of properties covering all commercially available LDPE's. Examples 18-21 disclose blown coextruded multi-layer films using core and skin layer of the same composition with an LDPE-D having an MI of from 0.75 and a density of 0.923 (See Table 5) blended Resin B and C being mLLDPE's. The haze is in excess of 10 (see Table 10).

U.S. Pat. No. 5,248,547 dated 28 Sep. 1993 and related cases U.S. Pat. No. 5,261,536 and U.S. Pat. No. 5,431,284 disclose a three layer film with an LDPE core having a melt index of 1 to 25 in the broadest range and linear PE skin layers in the form of znLLDPE having a melt index range of from 1 to 10. The skin layers may contain LDPE (see column 6). In the examples the znLLDPE has an MI of 3.3 and the core layers comprise LDPE having an MI of 1.9 or 7. No indication is provided of the deformation rate or haze.

U.S. Pat. No. 6,521,338 dated 18 Feb. 2003 has cling layer using a homogeneously branched linear polyethylene and an LDPE core layer in an A/B multi-layer structure. The LDPE has a melt index in excess of 1 g/10 min. In the examples the LDPE's have a melt index of 1.9 and 3.27 g/10 min. Haze and extrusion conditions are not detailed.

U.S. Pat. No. 6,482,532 published 19 November in Example 2 a film having a low haze of 1.1 in Table 2. The film is a multi-layer film with homogeneously branched low density linear polyethylene skin layers having a density of 0.902 and a melt index of 3.0 g/10 min and a core layer of an LDPE having an MI of 5.0 g/10 min.

U.S. Pat. No. 6,368,545 dated 9 Apr. 2002 seeks to improve the clarity of blown coextruded films wherein the melt extrusion temperature and/or the density of a core layer is higher than the equivalent for the skin layer or layers. The skin layers are formed from a composition consisting of single znLLDPE or mLLDPE polymer. The core layer may be formed of an LLDPE, optionally admixed with an HDPE or from blends with varying amounts of an LDPE (LD157 CW having an MI of 0.6 and a density of 0.932 g/cm$^3$) and an mLLDPE. There is no description of the conditions under which the multi-layer films were coextruded. While the use of compatible LLDPE's in the skin and core layers gives rise to haze values less than 8, examples containing LDPE have haze levels in excess of 8.

Column 8 lines 42-48 discusses the benefit of using grades with higher shear sensitivity for the core layer so as to increase the melt strength to sustain the bubble formed after extrusion by the molten extrudate but there is no suggestion that deformation rates may exceed the conventional levels for the type of multi-layer film concerned. In keeping with conventional thinking for avoiding surface irregularities, the use of LDPE in the skin layer was also was contemplated although not exemplified.

WO2006021081A discusses blown film extrusion processes and various factors influencing the process outcome stating that "the use of a small amount of HPLD which has a high molecular weight has been observed to allow large production increases when producing film from homogeneously catalyzed lldpe". But there is no indication as to how such a blend would be accommodated in blown film coextrusion.

Problems and Objectives

The film properties are the result of the combined effect of the coextrusion process conditions and the combination of polymer compositions selected for the different layers. In spite of the various suggestions for improvement in references cited above, it remains difficult to achieve good optical properties in combination with high production speeds and film performance, especially when narrow composition and molecular weight distribution linear polyethylenes, such as for example mLLDPE, are used to improve end use film performance.

It has been difficult to reach low haze value of less than 10 and especially less than 5. Often use of LDPE in the skin layer has been deemed necessary. Skin layers substantially consisting of mLLDPE's, useful in providing heat seal characteristics (see WO93/03093) remained difficult to process absent addition of other components. While high deformation rates were used in the extrusion of thin film structures, more substantial films were generally processed at lower speeds to reduce surface defects.

Good optical appearance as expressed by low haze values of less than 8 or 4 have thus been difficult to achieve and even more difficult to combine with higher process speeds.

Ethylene based polymers are generally seen as appreciably inferior from an opticals point of view when compared to oriented polypropylene films. Furthermore for stretch and cling film applications, additives other than polymers have to be added in significant amounts such as liquid polyisobutylene (PIB) or special polymers such as lower density VLDPE to induce enough cling.

It is among the objects of the invention to facilitate the production of low haze films that may be used for various applications, and optionally facilitate production under conditions that permit faster line speeds and/or reduced haze levels by a judicious combination of polymer component selection and processing conditions.

Apart from optical properties films also require good seal strength so as to permit the reliable packaging on a continuous packaging line at high speed. Apart from the above, control of stretch, shrink and/or heat sealing properties may also be desirable. It is among the objects of the invention to improve film coextrusion in relation to one or more of the above aspects.

DRAWINGS

FIG. 3 shows a rheology flow curve used in illustrating the determination of the zero shear viscosity.

SUMMARY OF INVENTION

Figure 1:
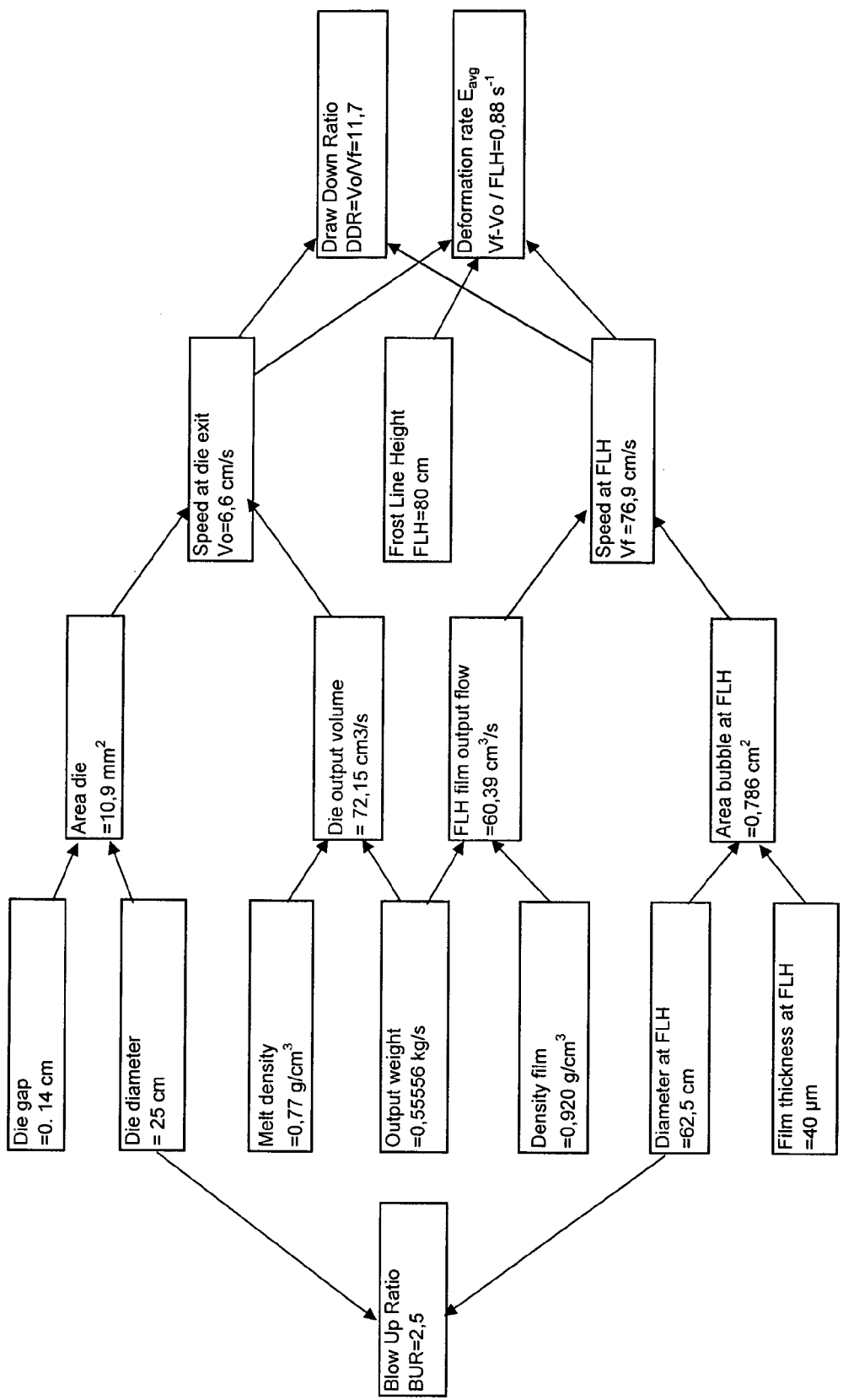
FIG. 1 is a block diagram illustrating the sequence of steps for determining the deformation rate described hereinafter.

In a first aspect the invention provides a method for determining process conditions for blown film coextrusion comprising:

A) coextruding a film having a core layer and a pair of core contact layers adjacent both sides of the core layer through a die exit at a linear speed $V_o$ cm/s; and cooling, orienting and crystallizing the multi-layer film formed until a frost line is reached at a distance FLH from the die exit by drawing the film at a take up speed $V_f$ in cm/s; the core contact layers having a composition of at least 90 wt % of ethylene based polymer of which at least 75 wt % is a linear polyethylene with an $I_{2.16\ linear\ pe\text{-}skin}$ of 2.5 g/10 min or less and the core layer having a composition of at least 90 wt % of ethylene based polymer or other compatible linear olefin based polymer of which at least 5 wt % is an LDPE with a $I_{2.16\ ldpe\text{-}core}$ of 1.5 g/10 min or less, and B) adjusting the process conditions and/or the compositions by:
(i) increasing the deformation rate $E_{avg}=(Vf-Vo)/FLH$ to a level above at least 0.5 $s^{-1}$, and/or
(ii) decreasing ratio of the zero shear viscosity in the core contact layer compositions over that of the core layer composition to a level less than 0.9, and/or
(iii) increasing the wt % of the LDPE with a $I_{2.16\ Idpe}$ of 1.5 g/10 min or less in the core layer and/or decreasing the wt % of LDPE, if present, in the core contact layers, said wt % being based on the total weight of polymer in the core and core contact layer composition respectively, to lower the haze value until a target haze value is reached; the zero shear viscosity being calculated from determinations of viscosity at different shear rates at 190° C. using the Cross model of the individual ethylene based polymers in the compositions and all $I_{2.16}$ values being determined according to ASTM D 1238 procedure A condition 190° C./2.16 kg.

The determination of the zero shear viscosity and the deformation rate is determined as described hereafter.

The underlying inventive approach is to make the core layer deformation resistant when it passes from the die exit to the frost line and to make the core contact layer, which is often on the surface of the film and forms a skin layer, relatively less deformation resistant (referred to herein as deformation compliant) and, in conjunction with this, to raise the deformation rate until the different deformation resistance of the layers finds expression in a different crystallization behavior of the skin layer that leads to the requisite reduction in haze. Without wishing to be bound by theory, it is believed that, depending on the thickness of the film and its composition, increased deformation rates can be used to improve clarity, with early strain induced crystallization of a higher density polyethylene core layer composition influencing crystallization of the core contact layer to reduce crystallite size and improve haze.

Certain ingredients not specified above or ingredients specified above with highly unusual characteristics may change the deformation resistance of the core or core contact layer unduly, even if such ingredients are present in small quantities. The adverse impact of such ingredients will be readily evident. The skilled reader will avoid such ingredients which have the effect of undermining the difference in deformation resistance between the core and skin layers. Similarly some additives or polymers, not normally used in transparent film, may have such poor miscibility that a high haze develops which cannot be compensated sufficiently using the above method and which will be readily evident and avoided by the skilled person.

Subject to those caveats, the invention permits process conditions to be established permitting a favorable compromise between processability and optical properties.

Zero Shear Viscosity

The ratio of the zero shear viscosity in the core contact layer compositions over that of the core layer composition is a dimensionless number that reflects one aspect of the deformation resistance of the respective core contact and core layers during the process. The enumerator and denominator are determined in the same manner from the zero shear viscosity of the ethylene based polymers contributing to the core layer or core contact layer as the case may be. The zero shear viscosity results from the calculation based on the Cross model described in the hereinafter; followed in the case of blends by a further calculation to determine the average zero shear viscosity for the particular blend of ethylene based polymers in each composition. The zero shear viscosity depends to a significant degree on the overall or average molecular weight of the chains of the ethylene based polymers in the respective layers. This aspect is reflected in the zero shear viscosity.

Whenever the zero shear viscosity or the calculated ratios based on it are mentioned in the description and claims, it is measured in accordance with the following principles and test details. The zero shear viscosity is determined following a rheology measurement made using a Rheometrics ARES machine for each of the ethylene based polymer components of the core and skin layer compositions. Where the compositions contain more than on ethylene based polymer, the overall zero shear viscosity is averaged using a blending rule described herein after.

To obtain the zero shear viscosity for the individual ethylene based polymer component, data from a sample is scanned and collected in accordance with ASTM D4440 R-020. Viscosity and shear stress are measured at a number of different shear rates applied by an oscillatory probe at 190° C. to prepare a rheology flow curve reflecting the polymer composition's flow behavior at that temperature. The same temperature may be used for ethylene based polymers containing more than 50 wt % of ethylene derived units.

The rheological data collected is interpreted using the Cross model as described for example in the "*Encyclopedia of Polymer Science and Engineering*" Volume 14 published by John Wiley and Sons 1988. Page 458 refers to the Cross equation. Three factors serve as the three input values of the Cross model. These factors are varied iteratively until the output curve predicted by the Cross model provides a best fit for the actual rheology data measured. The three factors are a) zero shear viscosity; b) relaxation time; and c) power law index. The Cross model inter-relates them as follows:

$$\text{Shear Stress} = (\text{Zero shear viscosity} \ast \text{shear rate})/(1+\lambda\ast\text{shear rate})\wedge M.$$

wherein Lambda ($\lambda$) is the relaxation time; and M is the power low index. The zero shear is indicative of the plateau viscosity. M is indicative of the slope of the shear curve in the high shear rate region.

By way of example, the rheology measurements for LD150BW at 190° C. are indicated in the following Table A. Table A shows the viscosity and shear stress values measured at different shear rates applied in the three left hand columns:

TABLE A

| Applied Shear rate (Pa) | Measured Viscosity (Pa·s) | Measured Shear stress (s$^{-1}$) | Predicted Viscosity (Pa·s) | Predicted Shear stress (s$^{-1}$) |
|---|---|---|---|---|
| 0.02 | 22506 | 450 | 22680 | 454 |
| 0.043089 | 20547 | 885 | 20468 | 882 |
| 0.092833 | 17796 | 1652 | 17747 | 1648 |
| 0.2 | 14662 | 2932 | 14678 | 2936 |
| 0.29356 | 13037 | 3827 | 13097 | 3845 |
| 0.43089 | 11519 | 4963 | 11539 | 4972 |
| 0.63246 | 10028 | 6342 | 10041 | 6350 |
| 0.92833 | 8656.2 | 8036 | 8635 | 8016 |
| 1.3626 | 7398.2 | 10081 | 7345 | 10008 |
| 2.0001 | 6257.6 | 12516 | 6186 | 12372 |
| 2.9357 | 5248.9 | 15409 | 5164 | 15160 |
| 4.309 | 4381.6 | 18880 | 4278 | 18433 |
| 6.3247 | 3618.2 | 22884 | 3520 | 22264 |
| 9.2834 | 2973.3 | 27602 | 2880 | 26740 |
| 13.626 | 2422.6 | 33010 | 2346 | 31963 |
| 20 | 1962.6 | 39252 | 1903 | 38056 |
| 29.357 | 1579.2 | 46361 | 1538 | 45164 |
| 43.09 | 1264.9 | 54505 | 1241 | 53455 |
| 63.247 | 1008.1 | 63759 | 998 | 63130 |
| 92.834 | 801.06 | 74366 | 802 | 74424 |
| 136.26 | 636.26 | 86697 | 643 | 87613 |
| 200 | 508.08 | 101616 | 515 | 103020 |
| 293.57 | 410.66 | 120557 | 412 | 121026 |
| 430.91 | 331.2 | 142717 | 330 | 142072 |

Following measurement, the Cross model factors are iteratively manipulated to generate a curve approximating that actually measured until the "best fit" is reached. Best fit is determined using the loss function for best fit, measured versus the predicted, defined as the sum of the differences in squares; SUMXMY2 where the x and y array is measured and predicted viscosity respectively. The zero shear viscosity at best fit is that which results in the minimum sum of the square differences. The solver tool in Microsoft Excel Windows 2000 version can be issued to perform the curve fitting.

The value of the zero shear viscosity time so determined represents the accumulation of effects influencing the shape of the rheology curve and especially the molecular weight. The zero shear viscosity is a single value for a polymer composition. For the values shown in the Table above for LD150BW the following Cross model factors helped achieve the approximation shown in solid lines in FIG. 3.

TABLE B

| | Cross parameters | |
|---|---|---|
| Zero shear | Lambda (s) | M (dimension less) |
| 27950 | 4.216 | 0.590 |

These are the values that help generate the predicted viscosity and shear stress in Table A above.

The zero shear viscosity is a more reproducible indication of the molecular weight than for example a GPC determination or a Melt Index measurement. The zero shear viscosity is biased towards reflecting the higher molecular weight end.

In the examples and tests herein as well as the claims reference is made to the calculated zero shear viscosity. Where a composition has only a single polymer component, the calculated zero shear viscosity is that measured as described above. Where a composition contains more than one polymer component, a conventional blending rule is applied to calculate the zero shear viscosity from the values for the individual components.

The log additive blending rule for determining the overall, calculated zero shear viscosity in a particular layer is based on the following equation:

$$10^{\wedge}([\text{wt \% linear polyethylene}]\times\log ZSV_1+[\text{wt \% LDPE}]\times\log ZSV_2)$$

where $ZSV_1$ is the zero shear viscosity of a first component and $ZSV_2$ is the zero shear viscosity of a second component. Usually one is linear polyethylene and the other LDPE but the formula also can be adapted to have more than 2 components and can accommodate blends of different linear polyethylenes or different LDPE's. The rule is described for example in "Rheological behavior of reactive blending of epoxidized natural rubber . . . . " by C. Nakason et al in the Journal of Applied Polymer Science, Vol 91, 1752-1762, 2003 at page 1759.

Where non-ethylene based polymers are present such as polypropylene, they are excluded from the calculation of the overall zero shear viscosity, which is intending to reflect the rheological behavior of the ethylene based polymers only.

Deformation Rate

It appears that the speed with which the film is deformed after exiting the die influences the manner in which the crystallization and orientation of the core layer impacts on the crystallization of the core contact layer.

The deformation rate is determined in same way in the description, the examples and claims. The method is fully reproducible and known to people skilled in the art. FIG. 1 summarizes the steps for its determination.

The speed $V_0$ with which the coextruded polymer mass passes through the die exit is compared with the speed $V_f$ at the FLH location. The rate of deformation $E_{avg}$ is the average rate of change of speed between the die exit and FLH location: $(V_f - V_o)/FLH$.

The frost line is the location at which no further deformation takes place. The location is a line formed where the molten polymer undergoes the transition to solid state due to increasing cooling and crystallization. Initial deformation in a blown film extrusion machine may be in a machine direction and in a transverse direction as the bubble inflates. The final stage of deformation is generally in a machine direction only following bubble inflation and the associated transverse direction orientation.

The location of the frost line can be determined visually in ambient light. Generally the haze of the film shows at this location as crystallites diffract the light. The frost line may also be detected by optical apparatus, including infra-red inspection, especially where the haze of the solid film approaches that of the molten extrudate and visual detection becomes difficult, generally at a haze level of less than 3.

The height of the frost line referred to herein (FLH) is the distance between the die exit and the frost line. Generally a sufficient accuracy can be obtained by determining the FLH in one position. The precise position may drift or undulate around the bubble. For greater accuracy the FLH may be measured at a number of locations and/or averaged over time from a number of successive measurements.

Where more than one frost line is present, the location of the last frost line is to be taken for the purpose of the FLH determination.

To calculate the speed $V_0$ with which the coextruded polymer mass passes through the die exit, first the cross-sectional area of the annular die exit is determined using the length of the die circumference and die exit gap.

The speed of the polymer mass passing through the die exit can be accurately determined by converting the weight of raw polymer consumed (using a weighing cell in an extruder hopper conventionally installed for such a purpose) into volume by using the general standard density value of 0.77 g/cm$^3$ at 190° C. (which value is generally accepted for molten polyethylene type polymers in the literature). The die exit area and volume information can be combined to provide a linear speed at the die exit $V_o$.

To calculate the speed $V_f$ with which the coextruded polymer mass passes through the frost line, the die diameter, blow up ratio (BUR) and one or a series of measurements of the film thickness (using a conventional micrometer apparatus) are combined to determine the cross-sectional area of the film bubble at the frost line. The density used in the calculation is the average of the densities of the polymer components and other materials used for the solid polymers. The thickness of the film will be attenuated considerably compared with the die gap as the film accelerates towards the frost line. The $V_f$ calculated will generally be the same as the haul-off or take up speed if that measurement is correctly calibrated.

FIG. 1 also illustrates how the same information can be used to determine other parameters from the above information. The ratio Vo/Vf represents the draw down ratio (DDR). The DDR is a function of the die gap, film thickness or the BUR. The lower the film thickness, the higher the drawdown ratio will become for a given die gap and BUR.

The deformation rate can be controlled by:
(i) varying $V_o$. Decreasing $V_o$ increases the deformation rate. This can be done by widening the die gap, lowering output in terms of kg/h of polymer composition consumed or by increasing the die diameter;
(ii) controlling $V_f$. A higher take up speed will increase $V_f$ and increase the deformation rate and the machine direction orientation. A thinner film or a similar thickness at a lower BUR can be obtained;
(iii) controlling FLH by changing extrusion temperature of the extrudate or the cooling rate between die exit and the frost line by the adjustment of cooling air. Increased cooling will reduce FLH and increase the deformation rate for a given speed difference between die exit and frost line.

The necessary control can be accommodated on conventional blown film extrusion machines or additional output can be achieved using modifications for example by providing for increased cooling of the film.

Other film process conditions remain available to adjust other film characteristics independently of the deformation rate, such as the draw down ration DDR. In practice the appropriate adjustments are made keeping in mind the ultimate stretch or shrink properties that are desired for the final film and the polymer compositions used.

A combination of the aforementioned deformation rate control and other process controls can be used to permit the production of films of low haze for a wide variety of end use applications by influencing polymer chain relaxation and shrinkage.

In blown film extrusion deformation rates may vary with the thickness of the film. Conventionally this might be as low as 0.01 s$^{-1}$ for a 200 μm film with a BUR of 4, and a die gap of 1 mm taken up at a low out put at one end, and up to 8 s$^{-1}$ for a thin film from a 10 μm; a die gap of 2.5 mm, a low BUR of 2 taken up at high speed. The inventive effect due to the invention is triggered by raising the deformation rate above the conventional level for a given film thickness in combination with a suitable density differential between core and core contact layers and presence of low MI LDPE in the core layer and absence of countervailing deformation resistance in the core contact layers.

To optimize performance, preferably then the compositions are further adjusted by increasing the average density of ethylene based polymer in the core layer or layers above that of the ethylene based polymer of the skin layers.

Deformation rates, $I_{2.16}$ values of LDPE and linear polyethylene, as well as their proportions in the compositions may be balanced to achieve the desired haze. For example, high deformation rates may be used to overcome the effect of a relatively high $I_{2.16}$ values of LDPE in the core layer.

Haze Determination

Optical properties of light transmission and scattering include: haze measured through the bulk of the film, clarity measured through the bulk of the film, gloss at an angle of 45° measured on the outside surface of the film and gloss at an angle of 45° measured on the inside surface of the film.

Haze as used herein in the specification and claims represent the scattering in transmission of light at an angle>2.5° from the incident angle and reduces the contrast of objects viewed through the film. It involves scattering on the surface, referred to as surface haze, and in the interior of the film, referred to as internal haze and depending largely on the crystallites formed as the film cools after extrusion. References herein to haze are references to the overall haze and represent the ratio of diffused light to the total light transmitted by the film. Clarity refers to the proportion of light transmitted at an angle<0.1° from the incident angle. The gloss is a measure of the light that is reflected at the same angle as the incident beam but in opposite direction.

The specification uses haze as its main criterion for the optical properties. In this specification and the claims, haze is measured in accordance with ASTM D-1003 procedure B using a Hunterlab Ultrascan XE spectrophotometer 2096 using Geometry B. The haze is the ratio in % of the diffused light relative to the total light transmitted by the sample film. The haze is measured in total transmittance mode, illuminant C, 2° observer, scale XYZ as standard.

Illuminant C: overcast skylight, 6740K

2° observer: 2° filed of view, focus on the fovea 1931 CIE standard observer

Scale XYZ: X=red light related/red/green coder
Y=green light related/black white coder
Z=blue light related/blue-yellow coder Only the Y value is relevant for haze and represents the total light transmitted through the sample.

Having explained the general approach towards the selection of optimized films and process conditions, in a second aspect the invention concerns a blown film coextrusion process comprising:

melting and extruding a core layer and a pair of core contact layers adjacent both sides of the core layer through a die exit at a linear speed $V_o$ cm/s and cooling, orienting and crystallizing the multi-layer film formed at a deformation rate $E_{avg}$=(Vf–Vo)/FLH of at least 0.6 s$^{-1}$ until a frost line is reached at a distance FLH from the die exit by drawing film at a take up speed $V_f$ in cm/s at the frost line, said layers being of a film forming polymer composition comprising at least 90 wt % of ethylene based polymer or other compatible linear olefin based polymer;

in which the core layer composition contains at least 5 wt % of LDPE having an $I_{2.16\ Idpe\text{-}core}$ of less than 1.5 g/10 min and the composition of the core contact layers contains at least 75 wt % of a linear polyethylene or other linear polyolefin and the ethylene based polymer of the core layer has an average density of ethylene based polymers equal to or higher than that of ethylene based polymer of the core contact layers, the compositions being selected so as to make the core layer more resistant to deformation than the skin layers, the $I_{2.16}$ values being determined according to ASTM D 1238 procedure A condition 190° C./2.16 kg.

Suitably the linear polyethylene of the core contact layers has an $I_{2.16\ linear\ pe}$ of 2.5 g/10 min or less, even less than 2.2 or less than 2.0 and/or the ratio of the zero shear viscosity, calculated from determinations of viscosity at different shear rates at 190° C. using the Cross model of the individual ethylene based polymers in the skin layer composition over that of the core layer composition, is less than 1.

At the lower end the $I_{2.16\ linear\ pe}$ of the core layer may be limited by the ability of the equipment to process the more viscous high molecular weight materials.

By avoiding a core density lower than the skin density, the risk of the core layer not influencing the crystallization of the skin layer in the desired direction is reduced. The average density is the arithmetic average of the densities of the component making up the respective layers. The deformation resistance can be assessed by considering the haze or the nature of the crystallization achieved in the respective layers as will be explained hereafter by reference to FIGS. 2A and 2B.

The examples herein show that the deformation resistance can be more precisely captured by further considering other film composition parameters.

The invention hence provides in a third aspect a blown film coextrusion process comprising:

(A) supplying a core layer composition containing at least 90 wt % of an ethylene based polymer or other compatible linear olefin based polymer of which at least 5 wt % is an LDPE with a $I_{2.16\ Idpe\text{-}core}$ of 1.5 g/10 min or less and from 0 to 10 wt % of a balance of a heterogeneously branched ethylene based polymer other than LDPE;

(B) supplying a pair of core contact layer compositions, each containing at least 90 wt % of ethylene based polymer of which at least 75 wt % is a linear polyethylene with a $I_{2.16\ linear\ pe\text{-}skin}$ of 2.5 g/10 min or less and an $I_{21.6\ linear\ pe\text{-}skin}/I_{2.16\ linear\ pe\text{-}skin}$ ratio below 30;

wherein the ratio of the zero shear viscosity calculated from determinations of viscosity at different shear rates at 190° C. using the Cross model of the individual ethylene based polymers in the core contact layer compositions over that of the core layer composition is less than 0.9, preferably less than 0.7; and wherein the core layer has an average density of ethylene based polymers as measured by ASTM D2839/D1505 equal to or higher than that of the core contact layers; and (C) melting and extruding core and core contact adjacent both sides of the core layer through a die exit at a linear speed $V_o$ cm/s and cooling, orienting and crystallizing the multi-layer film formed at a deformation rate $E_{avg}$=(Vf–Vo)/FLH>0.6 until a frost line is reached at a distance FLH from the die exit by drawing the film at a take up speed $V_f$ in cm/s at the frost line, the $I_{2.16\ Idpe}$ values being determined according to ASTM D 1238 procedure A condition 190° C./2.16 kg.

In each of the above aspects, regardless of the degree of characterisation of the polymer compositions, the underlying action is simple. The compositions are adapted to promote the influence of the core layer, when deformed at a high rate on the core contact or skin layers in the progress of cooling and crystallization in such a way that the haze is improved. The low $I_{2.16}$ LDPE in the core layer is more difficult to deform during extrusion and before the frost line is reached because of its high molecular weight and extensive long chain branching and this may have a haze improving effect especially if a) the core contact or skin layer does not contain extensive long chain branching and/or high levels of LDPE or other branch containing polymer species that outweigh the effect of the LDPE in the core layer and b) the crystallization of the core contact or skin layer does not precede that of the core layer by virtue of low short chain branch levels as evidenced by the density.

The compositions may contain more than one LDPE or linear polymer. In such cases the blends are measured or calculated to determine the average $I_{2.16}$ values or density to be used in reviewing the claims and corresponding statements in the description.

Provided the compositions and associated rheological and crystallization properties of the skin and core layers are differentiated as discussed herein, the skin and core layers other forms of free radical initiated polymers such as EVA, EMA and EAA and/or up to 10 wt % of the core and skin layer composition may be formed by materials other than ethylene based polymers or other linear polyolefin polymers. Provided again any extremes are avoided, the composition may include linear polyethylenes that are bimodal in either molecular weight distribution or composition distribution.

Again provided the compositions and associated rheological and crystallization properties of the skin and core layers are differentiated as discussed herein, the linear polymer components may include a homogeneously branched linear polyethylene having long chain branches with seven or more carbon atoms that can complement the action of the LDPE in the core layer. For example the LLDPE or VLDPE's used may have a high $I_{21.6}/I_{2.16}$ ratio and a narrow molecular weight distribution indicative of long chain branching. However the differentiation may be hindered by the inclusion of excessive amounts of high molecular weight and/or linear polyethylenes that are long chain branched and reinforce the deformation resistance of the skin layer. The necessary adjustments by way of compensation to avoid insufficient differentiation in the deformation resistance will be apparent in the context of the overall teaching of this specification. Preferably the core layer composition contains no or less than 4 wt % of a linear polyolefin other than linear polyethylene and/or contains no or less than 4 wt % of a heterogeneously branched ethylene polymer other than LDPE.

The deformation rate in the invention is towards the high end for a given thickness, BUR and film take up speed, so as to limit the time available for polymer chain relaxation in the machine direction following extrusion.

In yet a further aspect of the invention, films may be produced with novel combinations of layers and compositions that have a low haze. This aspect of the invention can be combined with all features mentioned in connection with the film structure and composition mentioned previously. According to this aspect the invention provides a multi-layer coextruded film having a thickness of 5 to 200 µm and comprising a skin layer and core contact layers on each side of the core layer and contiguous therewith, the core layer composition containing at least 90 wt % of an ethylene based polymer of which at least 12 wt % is an LDPE with a $I_{2.16\ ldpe\text{-}core}$ of 0.5 g/10 min or less and from 0 to 10 wt % of a balance of one or more linear olefin based polymers other than ethylene based polymer;

each core contact layer composition containing at least 90 wt % of ethylene based polymer of which at least 75 wt % is a linear polyethylene with a $I_{2.16\ linear\ pe\text{-}skin}$ of 2.5 g/10 min or less and an $I_{21.6\ linear\ pe\text{-}skin}/I_{2.16\ linear\ pe\text{-}skin}$ ratio below 30;

the ethylene based polymer of the core layer having an average density equal to or higher than that of ethylene based polymer of the skin layers and the ratio of the zero shear viscosity calculated from determinations of viscosity at different shear rates at 190° C. using the Cross model of the individual ethylene based polymers in the skin-layer compositions over that of the core layer composition being less than 0.9, preferably less than 0.7;

said film having a haze of from 0.5 to 6 as determined by a method based on ASTM D-1003 described herein, all $I_{2.16}$ values being determined according to ASTM D 1238 procedure A condition 190° C./2.16 kg.

The film may have varying thickness with a lower limits of 10, 20 or 40 µm and upper limits in thickness of 150 and 100 µm. The upper and lower limits may be combined in any manner. Preferably the multi-layer contains at least 97 wt % of linear polyethylene, preferably of an mLLDPE, and the core layer contains less than from 5 to 50 wt % wt % of the LDPE having a $I_{2.16\ ldpe\text{-}core}$ of 0.5 g/10 min or less.

High levels of difficult to process mLLDPE's with a low $I_{21.6}/I_{2.16}$ may be included in the skin layer to permit extrusion to a low level haze with enough low $I_{2.16}$ LDPE in the core layer.

TECHNICAL EFFECTS

The invention can be used to permit a higher out put to be obtained at the same or better haze level even for films of polymers that are usually regarded as difficult to process (narrow molecular weight distribution linear polyethylenes for example). Whereas usually faster extrusion was perceived to hinder optical properties with the invention faster process can be combined with better haze for a variety of film structures. The shear sensitivity of the skin layers thus may be less critical and highly linear polyethylene may be used in greater amounts for the skin layers, benefiting impact strength heat seal properties, extractability etc, also for films having thickness in excess of 20, 30 or 40 µm. The use of LDPE in the skin layer can be minimized. Only low amounts of LDPE with a low $I_{2.16}$ may be used to produce low haze films at processing speeds above those conventionally adopted for films with an equivalent thickness and structure.

Thus although the skin layer may be relatively deprived of LDPE, the film does not suffer surface melt fracture at high process speeds. High haze and clarity can be achieved, also for thick films. In appropriate cases the optical properties of OPP films can be approximated. The process can be steered towards the desired optical properties by balancing the type and presence of LDPE in the core and skin layers and controlling the deformation rate. Increased amounts of LDPE in the core layer or lower $I_{2.16}$ in the core layer or higher deformation rates tend to improve clarity with conventional film thicknesses.

Figure 2A:
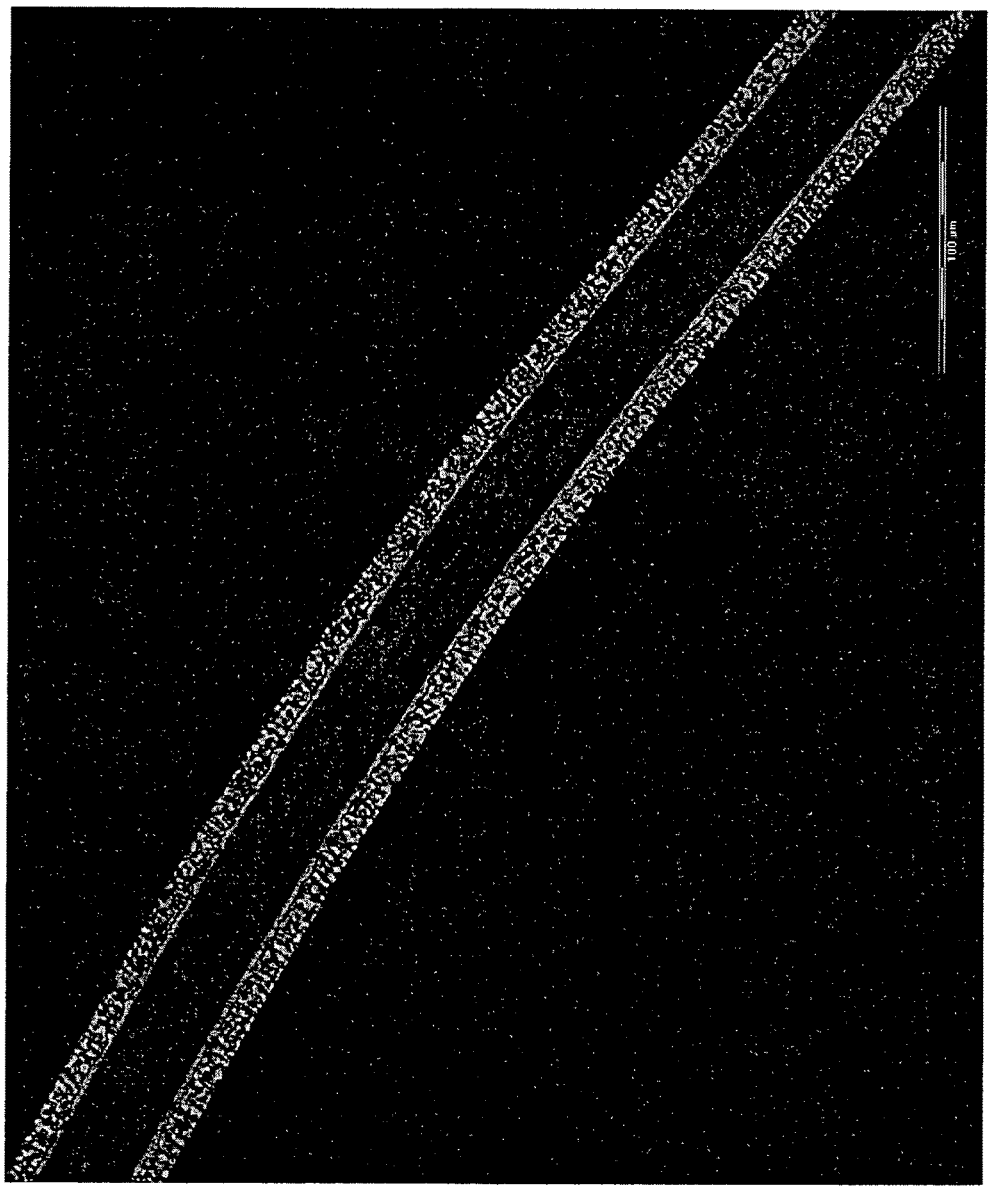
FIGS. 2A and 2B are microtome photographs showing the effect of the increased deformation rate according to the process of the invention on crystallite formation in the film.
Figure 2B:
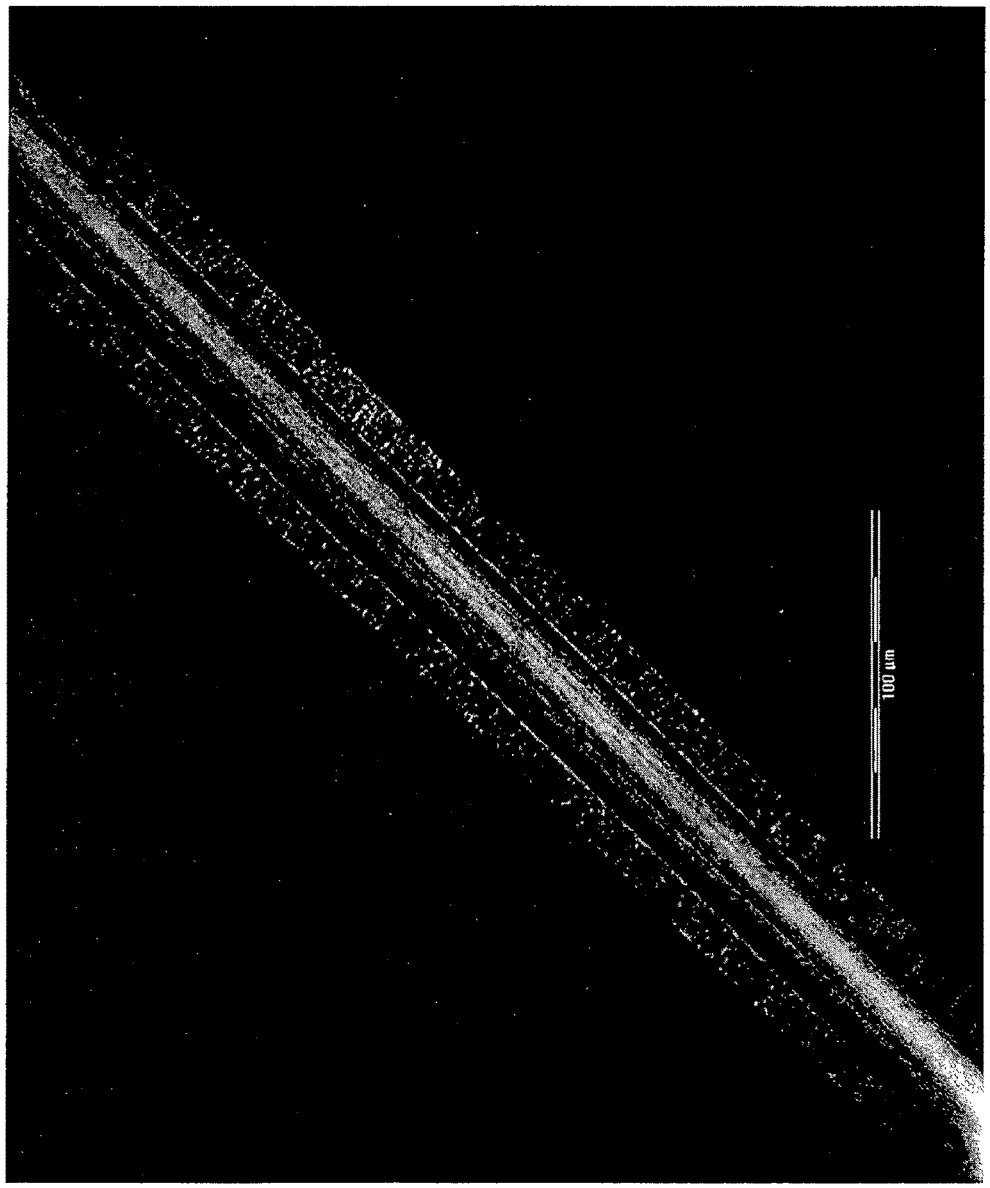

Some indication of the nature of the difference in film crystallization behavior is apparent from FIG. 2A, showing a film made by a comparative method, and FIG. 2B showing a similar film processed according to the invention.

Both films use Exceed 1018CA in a skin layer and a blend of 20% Exceed CA and 80% 0.2 MI LDPE in the core layer. Both films have a thickness of 50 µm and cut by microtome into 6 micron slices and inspected at 400 times magnification. The comparative film has thickness distribution of 1/2.5/1 and is processed at a BUR of 3.8 and a deformation rate pf 0.37 $s^{-1}$. The film made by the process of the invention has a thickness distribution of 1/2/1 at a BUR of 2.5 and a deformation rate of 0.64 $s^{-1}$. The comparative made at the low strain rate has a haze of 12.7. The invention provides a haze of 5.5.

It can be seen in FIG. 2A that in the comparative superspherulitic crystalline regions are formed without much strain induced crystallization in the core layer. Larger light diffracting crystallites are formed. By contrast, using the invention as seen in FIG. 2B, lamellar crystalline regions are formed in the skin layer and the core layer with evidence of deformation or strain induced crystallization because of the high deformation rate. These differences in crystalline formation are believed to be at least one factor contributing to the low haze.

The film and package can display an improved seal strengths in form fill and seal machinery; improved optical properties as measured by haze from use of LDPE in core and mLLDPE in skin; and improved stiffness and resistance to stretching that is important for some applications as well as improved shrink performance. The films can be formulated for and be used for green-house films because of their high mechanical properties; for pouches for packaging liquids because of their good sealing properties and strength; for wrapping films for bread or other over wrap applications.

Where high degrees of orientation are used, cling properties may be triggered in suitable films. Especially when using znLLDPE as the major skin component, cling properties may be promoted, lessening the need for the use of cling additives.

A package comprising a film described above can be heat sealed around the package content. Where the film has been oriented to the point where it possesses little residual stretch, it may be laminated onto another inextensible material such as paper or foil to provide a transparent surface.

FILM STRUCTURES

Suitably one or both core contact layers is or are a skin layer forming one or both film surfaces. The film may have an A/Y/A structure wherein A is a core contact layer and Y is an intermediate layer or layers including at least one core layer in contact with the core contact layer. The composition of the A layers may be the same or different but conform to the limitations set out herein. The film may have an A/B/X/B/A structure wherein A are skin layers and B are core layers and X represents one or more optional intermediate layers. Such films have two core contact layers that are internal and do not form skin or surface. The A and B The X layer may have the same composition as the composition of A.

Preferably the film has an A/B/A structure with the core layer in direct contact with two core contact layers that form the skin layers. Superior results may be obtained by creating the haze improving effect on both sides of the film.

Preferably the film has a core layer with a thickness which is from 0.5 to 6 that of the or each skin layer and the film has a thickness of from 5 to 200 μm The thickness of the films may vary. It may range generally from 8 to 200 μm. Generally the skin layer has a thickness less than that of the core layer. Suitably the core layer contains at least LDPE having an $I_{2.16}$ of from 0.05 to 0.8 g/10 min for higher potential line speeds and additional heat shrinkage when desired.

Sandwiching the LDPE in the core layer sandwiched between two predominantly (i.e. >50 wt %) mLLDPE skin layers creates a film with excellent optical properties. By adding low $I_{2.16}$ LDPE into the core layer, the mLLDPE in the skin can develop cling properties beyond what can be accounted for by the increased glossiness of the film. This effect is even more pronounced when a lower density mLLDPE, or VLDPE or a lower density znLLDPE is used as the main skin layer component as a skin layer.

Preferably the film has a thickness of from 20 to 180 μm, especially at least 40 μm and/or the core layer with a thickness which is from 0.5 to 6 that of each core contact or skin layer.

GENERAL ASPECTS

By suitable selection of process conditions and composition a film may be produced has a haze of from 0.5 to 8 as determined by a method based on ASTM D-1003 described herein. Generally speaking the haze may be improved by increasing the difference in deformation resistance between the core and skin layer and/or by increasing the deformation rate.

As an aid to achieving a desired haze value, the following rules may be used to allow for different values of $I_{2.16\ LDPE\ core}$:

TABLE C

| Haze target | Minimum deformation rate |
|---|---|
| 8 | $E_{avg} > 0.19a + 0.42$ |
| 7 | $E_{avg} > 0.24a + 0.50$ |
| 6 | $E_{avg} > 0.14a^2 + 0.025a + 0.64$ |
| 5 | $E_{avg} > 0.04a^3 + 0.26a^2 - 0.24a + 0.80$ |
| 4 | $E_{avg} > 0.32a^3 - 0.42a^2 + 0.21a + 0.80$ |
| 3 | $E_{avg} > 0.92a^3 - 1.78a^2 + 1.04a + 0.81$ |
| 2 | $E_{avg} > 1.35a^3 - 2.68a^2 + 1.56a + 1.15$ |
| 1 | $E_{avg} > 1.90a^3 - 3.41a^2 + 1.85a + 1.92$ |

Generally at an $E_{avg} > 0.14a^2 + 0.025a + 0.64$ wherein a $I_{2.16\ ldpe-core}$, a film may be produced having a haze of less than 6 as determined by a method based on ASTM D-1003 described herein. Generally at an $E_{avg} > 0.32a^3 - 0.42a^2 + 0.21a + 0.80$ wherein a is $I_{2.16\ PE\ core}$, a film having a haze of less than 4 as determined by a method based on ASTM D-1003 described herein may be obtained.

Suitably the zero shear viscosity of the LDPE in the core layer is higher than that of the linear polyethylene, if present, in the core layer. Other refinements to be used singly or in combination may help optimize the haze:
B) the skin layer or layers contains substantially no ethylene based polymer containing polar moieties.
C) the skin layer or layers contains substantially no other linear polyolefin polymers.
D) the skin layer or layers contains substantially no homogenously branched linear polyethylene.
E) the skin layer consists substantially of the linear PE and optionally LDPE.

In certain cases where the amount of linear polyethylene in the film is to be maximized to obtain good physical properties, advantageously the core contact layers contain at least 95 wt %, preferably at least 98 wt %, of linear polyethylene. The linear polyethylene of the core contact layers contains may be an LLDPE and preferably contains at least 60 wt %, preferably at 90 wt %, of an mLLDPE based on the total weight of the linear polyethylene.

The core contact layers may contain no or less than 2 wt % of an ethylene based polymer containing polar moieties and/ or contain no or less than 5 wt % of a substantially homogenously branched linear polyethylene.

Significant effects can be achieved where the core layer contains from 15 to 80 wt % of LDPE. Alternatively the core contact layer composition may contain at least 90 wt % of linear polyethylene and the core layer contains less than 10 wt % of the LDPE having a $I_{2.16\ ldpe-core}$ of 1.5 g/10 min or less.

In appropriate cases skin layers may consist substantially of the linear polyethylene and optionally an amount of, preferably high $I_{2.16}$ LDPE.

Particle sizes of talc or silica anti-block useful for antiblock in films may vary as is well known in the art. Suitably the core contact layer or layers are skin layers and comprise less than 8000 ppm of opacifying agent such as anti-block particulates, preferably less than 2000 ppm of anti-block particulates, and more preferably less than 500 ppm. Preferably the core contact layer or layers are skin layers and the linear polyethylene in the skin layer is comprises or consists of mLLDPE and contains less than 5000 ppm of anti-block particulates, preferably less than 3500 ppm.

To optimize clarity and other film properties preferably the linear PE in the skin layer comprises or consists of mLLDPE, preferably containing less than 250 ppm of anti-block particulates. Anti-block additives such as silica generally raise the haze and there should be minimized. Even in the presence of anti-block, the invention can be used to produce films have haze values lower than would otherwise be the case. Slip agents may be added to modify the surface properties such as friction. 17.

SPECIFIC ASPECTS

The process of the invention can be optimized to make films with a wide variety of performance characteristics detailed below including flexible film, food and non-food packaging film. Films may take the form of cling film, low stretch film, non-stretch wrapping film, pallet shrink, overwrap, agricultural, and collation shrink film and laminated films, including stand-up pouches.

Flexible thin films comply readily with other surfaces and with suitable additivation can be used as cling film. Thicker films with a relatively high amount of linear polyethylene can be cold stretched and exert a contracting force around articles or bundles of article around which they are wrapped. They are described as stretch films. The tendency to shrink when heated can be emphasized to provide shrink films. By providing suitable skin layers non-stretch film or stretch films can be heat sealed.

Using the invention a stretch film may be produced, with any of the features referred to individually above, the process being operated to produce a film with stretch at a thickness from 8-40 μm, the core layer composition having at least 20 wt % of the LDPE, the core contact layer composition consisting substantially consisting of a linear polyethylene, including VLDPE, LLDPE, HDPE or blends thereof under conditions including a BUR of from 1.5 to 2.5 and a deformation rate of $1.5\ s^{-1}$ to $13\ sec^{-1}$ to produce a film having machine direction elasticity. The film may have a thickness of 15 to 40 μm and the BUR is from 2 to 2.5 to produce a stretch film.

In a more specialized aspect of the invention thin films may be made having a thickness of from 10 to 40 μm. Such thin films may be produced in a stiff oriented form (often referred to as "pre-stretched" by persons skilled in the art) and may be useful for laminating to inelastic materials such as BOPP, foil or paper substrates.

Using the invention, with any of the features referred to individually above, cling film can be produced with variable levels of stretch, the process operated to produce a film with stretch at a thickness from 8-20 μm, the core layer composition having at least 20 wt % of the LDPE, the core contact layer composition consisting substantially consisting of a linear polyethylene, including VLDPE, LLDPE, HDPE or blends thereof under conditions including a BUR of from 2 to 3.5 and a deformation rate of $2\ s^{-1}$ to $10\ sec^{-1}$ to produce a film having cling properties. Suitably then the core contact layer contains at least 60 wt % of a znLLDPE having a density of less than $0.925\ g/cm^3$. Preferably the skin layer contains at least 60 wt % of a znLLDPE having a density of less than $0.925\ g/cm^3$. The low molecular weight impurities in the znLLDPE are believed to be driven to the surface in amounts sufficient to provide cling. znLLDPE having hexene comonomer may be especially suitable. By using a znLLDPE in the skin layer, the invention produces a surface that has a certain amount of inherent cling that can reduce the amount of expensive cling additive that must be added to obtain satisfactory cling force.

Using the invention, with any of the features referred to individually above, stiff packaging may be produced with a thickness from 20 to 80 μm, the core layer having at least 20 wt % of LDPE, under conditions including a BUR of from 1.5 to 3.5 and a deformation rate of $2\ s^{-1}$ to $8\ sec^{-1}$. The core layer composition may contain an mLLDPE having an $I_{21.6\ linear\ pe-core}/I_{2.16\ pe-core}$ ratio of at least 35 and at least 30 wt % of one or more LDPE's or contains an mLLDPE having an $I_{21.6\ linear\ pe-core}/I_{2.16\ pe-core}$ ratio of less than 30 and then contains at least 50 wt % of one or more LDPE's to thereby produce a film having shrink properties.

Thicker films of from 40 to 200 μm, generally having higher strength and greater elasticity, may be used for heavy duty bags etc.

Using the invention, with any of the features referred to individually above, films having heat shrink properties may be produced in which the core layer composition contains an mLLDPE having an calculated $I_{21.6\ linear\ pe-core}/I_{2.16\ linear\ pe-core}$ ratio of at least 30 and the combined weight of the LDPE and said mLLDPE is at least 40 wt %.

DETAILS OF COMPONENTS AND COMPOSITIONS

In preferred forms of the invention for the above aspects, an LDPE is used in the core layer having $I_{2.16}$ of from 0.05 to 1.5 g/10 min. Suitably the LDPE has a fractional $I_{2.16} < 1.2$ g/10 min, preferably <1 and optionally <0.8 g/10 min. The LDPE may even have an $I_{2.16} < 0.5$ or <0.25 g/10 min. The LDPE with a lower $I_{2.16}$, may be used in lower concentrations in the core layer to ensure that the overall $I_{2.16}$ of the composition as a whole remains amenable to coextrusion with the existing equipment.

The LDPE's may be made in a tubular or autoclave reactor. The density may vary from 0.91 to 0.94 $g/cm^3$, and is preferably at least 0.92 $g/cm^3$. The Mw/Mn as determined by GPC DRI may be at least 3. The LDPE may have a medium to broad molecular weight distribution defined herein as having an Mw/Mn as determined by GPC DRI of >4 and a high degree of long chain branching (LCB). The LDPE may have an Mw/Mn as determined by GPC DRI of less than 10, preferably less than 8. In the invention the core layer may contain more than one type of LDPE. In any event the core layer should contain a sufficient amount of the LDPE with a low $I_{21.6}$ LDPE of less than 1.5 g/10 min. The LDPE's preferably have $I_{21.6}/I_{2.16}$ higher than that of the LLDPE in the skin layer, preferably at least 5, 10 or 20 units higher.

LLDPE's as defined herein and used for any of the above aspects, preferably have a density>0.915 $g/cm^3$. The density may be <0.935 $g/cm^3$ or <0.925 $g/cm^3$. The $I_{2.16}$ may range from 0.1 to 10 g/10 min and is determined by ASTM D-1238. The $I_{2.16}$ may be >0.4 g/10 min or >0.8 g/10 min and <6 g/10 min or even <3 g/10 min. Again regard must be had to the overall flow properties necessary for film extrusion in determining the concentration of the LLDPE. The linear polyethylenes may have short chain branches formed by the incorporation of higher alpha-olefins such as C4 to C8 alpha olefins including propylene, butene-1,4-methylpentene-1, hexene-1 and octene-1. The $I_{21.6}/I_{2.16}$ ratio may vary and be at least 5 or 10, and less than 100.

mLLDPE's may be made using a single site (often metallocene) catalyst. The use of a single site catalyst, even if supported on a catalyst support such silica, leads to improved homogeneity of the polymer. The Compositional Distribution Breadth Index (CDBI) may be in excess of 50%, preferably in excess of 60%. CDBI is a measure of the composition distribution of monomer within the polymer chains and is measured by the procedure described in PCT publication WO 93/03093, published Feb. 18, 1993 including that fractions having a weight average molecular weight (Mw) below 15,000 are ignored when determining CDBI. The CDBI is defined as the weight % of the ethylene interpolymer molecules having comonomer content within 50 percent of the median total molar comonomer content. For instance if the median total molar comonomer content of a certain group of ethylene interpolymers is found to be 4 mole percent, the CDBI of that group of interpolymers would be the weight percent of ethylene interpolymers having a molar comonomer concentration from 2 to 6 mole percent. If 55 wt % of the ethylene interpolymers had a molar comonomer content in the 2 to 6 mole percent range, the CDBI would be 55%. The CDBI of linear homopolymer polyethylene, which does not contain a comonomer, is defined to be 100%. The CDBI of a copolymer is readily calculated by data obtained from techniques known in the art, such as, for example, temperature rising elution fractionation as described, for example, in U.S. Pat. No. 5,008,204 or in Wild et al., 3. Poly. Sci, Poly. Phys. Ed., vol. 20, p. 441-455 (1982). Multi-site catalysts such as used for ZN LLDPE can be considered as having a broad compositional distribution with a CDBI of less than 50%.

mLLDPE may be made in a gas phase or solution process. mLLDPE's preferably have an Mw/Mn of from 1.5 to 4 as measured by DRI GPC, preferably at least 2.0, especially less than 3.5. The narrow Mw/Mn is a further indication of their homogeneity. mLLDPE can be used in the skin layers to benefit mechanical and sealing properties and provides improved properties in that respect in comparison with znLLDPE. Preferably the linear polyethylene in the skin layer comprises an mLLDPE and the skin layer or layers contain at least 25 wt % of the mLLDPE. In the mLLDPE, preferably hexane extractables are less than 1.5 wt %, preferably less than 1 wt %, especially less than 0.6 wt %. Levels of antiblock particulates may vary. The FDA hexane extractable test used is from the version current to 7 Jul. 2003. The test was performed according to 21 CFR 177.1520 (d)(3)(ii)(e) using a film for extraction and weighing the dried film after extraction and drying to measure the weight loss.

The preferred mLLDPE is largely linear and combines an Mw/Mn of from 2 to 3.5 with an $I_{21.6}/I_{2.16}$ ratio of 10 to 30. The mLLDPE believed to have some long chain branching and less preferred for use in the skin layer may have an Mw/Mn of from 3 to 4 and an $I_{21.6}/I_{2.16}$ ratio of from 35 to 60.

The mLLDPE for the core contact or skin layer of the film of the invention may be made by gas phase polymerization processes such as those described in WO94/25495 incorporated by reference for US purposes. The preferred material is an mLLDPE without although in some forms of the invention long chain branching may be present. Such long chain branched polymers may be made by the process described in WO98/44011 incorporated by reference for US purposes.

While the disclosures rely on metallocene single site supported catalysts, other transition metal components may serve as single site catalysts and provide appropriate polymer homogeneity and absence of low molecular weight extractables. In addition conventional titanium based Ziegler Natta catalyst systems may be optimized to reduce the production of low molecular weight extractables. Such polymers can be equally suitable for the films of the invention and are to be understood as falling in the category of mLLDPE as defined herein.

znLLDPE's may be made using multi-site titanium based Ziegler Natta catalysts. znLLDPE polymers may have a narrow to medium molecular weight distribution defined herein as having a Mw/Mn as determined by GPC DRI of <5.

The GPC procedure used herein is as follows. Mw and Mn were measured by GPC (Gel Permeation Chromatography) on a Waters 150 gel permeation chromatograph equipped with a differential refractive index (DRI) detector and Chromatix KMX-6 on line light scattering photometer. The system was used at 135° C. with 1,2,4-trichlorobenzene as the mobile phase. Shodex (Showa Denko America, Inc) polystyrene gel columns 802, 803, 804 and 805 were used. This technique is discussed in "Liquid Chromatography of Polymers and Related Materials III", J. Cazes, editor, Marcel Dekker. 1981, p. 207, which is incorporated herein by reference for US purposes. No corrections for column spreading were employed; however, data on generally accepted standards, e.g. National Bureau of Standards Polyethylene 1484 and anionically produced hydrogenated poly-isoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customized LALLS software in conjunction with the standard Gel Permeation package.

znLLDPE may be present at the same time as an mLLDPE. Additional improvement in haze may be obtained where the skin layers contain at least 10 wt % of an LDPE.

Suitably the density of the core layer is increased by the inclusion of at least 5 wt % based on the total weight of polymer in the core layer of an HDPE and/or the density of the core layer is at least 0.006 g/cm$^3$ higher than that of the LLDPE in the skin layer.

The mLLDPE can be conveniently prepared by polymerization using a transition metal compound as a catalyst. The polymerization may be gas phase, slurry or solution polymerization for example. Using a series reactor combination, polyethylene polymers can be produced with broader molecular weight distribution or compositional distribution.

The core contact layer or skin layer in the multi-layer film structures of the invention may contain, in admixture with the mLLDPE, small amounts, generally less than 20 wt % of a high pressure low density polyethylene; a linear high density polyethylene or polypropylene or a combination thereof. The core layer may contain varying amounts of a linear very low density polyethylene having a density of from 0.86 to 0.91 g/cm$^3$, an LLDPE which may be a znLLDPE or mLLDPE, having a density of from 0.91 to 0.94 g/cm$^3$; and/or an elastomer with ethylene or propylene derived crystallinity.

The relative haze reduction may be more pronounced where other steps to reduce haze have not been taken or have only been implemented to a limited extent but the new option provided by this invention is compatible with other known options. The invention thus permits additional multilayer film constructions in which the inherent restrictions on the composition of the skin and core layers, inherent in such earlier techniques for improving haze, are avoided.

The properties of the film can be further tailored by inclusion of other polymeric materials in the core or skin layers. The core layer density can be increased by adding a HDPE having a density of from 0.94 g/cm$^3$ upwards. Such HDPE's are linear and may be made by gas phase or slurry polymerization. Any the layers of the film may contain a polypropylene polymer which may be a homopolymer or copolymer containing ethylene or other alpha-olefins as a comonomer, generally to stiffen the film.

EXAMPLES

Test Methods not Described Previously

The $I_{2.16}$ is measured here and elsewhere in this specification being determined according to ASTM D 1238 procedure A condition 190° C./2.16 kg. It may be referred to occasionally herein at the MI for brevity. The MFR was determined according to BS EN ISO 1133:2005 Condition M.

Density is measured according to ASTM D2839/D1505.

Thickness was measured using a Micrometer and is measured also during the above haze measurement.

Starting Materials

The tests for the examples were performed with the polymer materials given in Table 1. The units are those used elsewhere in the description.

TABLE 1

|  |  | MI | Density | Mw/Mn | MIR | Zero-shear Viscosity @ 190° C. |
|---|---|---|---|---|---|---|
| ExxonMobil LDPE grades | LD166BA | 0.2 | 0.9225 | 6.4 | 90* | 132368 |
|  | LD165BW1 | 0.33 | 0.922 | 6.8 | 88 | 93978 |
|  | NX00328 | 0.35 | 0.9285 | 4.8 | 80* | 57193 |
|  | LD150BW | 0.75 | 0.923 | 6.5 | 60 | 27950 |
|  | LD156BW | 0.75 | 0.9255 | 4.6 | 60 | 24531 |
|  | LD159AC | 1.2 | 0.923 | 6.1 | 60* | 17140 |
|  | LD100BW | 2 | 0.9225 | 5.4 | 50 | 8854 |
|  | LD185BW | 2 | 0.9225 | 5.4 | 50 | 8854 |
|  | LD152BW | 2.2 | 0.933 | 3.7 | 53 | 5958 |
|  | LD160AS | 4 | 0.9225 | 5.3 | 42 | 3000 |
| Exceed mLLDPE unbranched grades | 1018CA | 1 | 0.918 | 2.1 | 16 | 6617 |
|  | 1012CA | 1 | 0.912 | 2.1 | 16 | 6000 |
|  | 1327CA | 1.3 | 0.927 | 2.1 | 16 | 5680 |
|  | 2018CA | 2 | 0.918 | 2.1 | 16 | 3416 |
| ExxonMobil znLLDPE grades | LL1001XV | 1 | 0.918 | 3.9 | 25 | 9900 |
| ExxonMobil mLLDPE homogeneously branched | 20H10AX | 1 | 0.920 | 3.3 | 40 |  |
|  | 27H07AX | 0.5 | 0.927 |  | 48 |  |
|  | EXP502 | 0.5 | 0.920 | 3.2 | 45 |  |
| ExxonMobil polypropylene | PP4352F1 | MFR 3 | 0.9 | 4.1 | NA |  |
| ExxonMobil HDPE | HTA108 | 0.7 | 0.961 | 9.4 | 66 |  |

All grades are commercially available from ExxonMobil Chemical Company or in the case of the homogeously branched mLLDPE polymers can be prepared according to the teaching of WO94/44011 using the properties indicated in the Table 1.

LD166 contains 1.2 wt % of a masterbatch based on the weight of the LD166 with Irganox 1076 as anti-oxidant. Runs 60 to 79 used 1.5 wt % of masterbatch added to the skin layers based on the weight of the Exceed 1018CA grade containing erucamide as slip agent and natural silica as anti-block. All pallet shrink examples used a masterbatch added to the skin layers with natural silica as anti-block.

Equipment

All multilayer films were made on a Windmöller & Hölscher 3-layer coextrusion blown film line with following features:

Extruder A (skin layer, outside of bubble): 60 mm diameter, smooth bore
Extruder B (core layer): 90 mm diameter, grooved feed
Extruder C (skin layer, inside of bubble): 60 mm diameter, grooved feed
250 mm die diameter
1.4 mm or HQ 1.25-2.25 mm die gap.
IBC and Optifil P2K thickness profile control Other structures were run at Lengerich at W&H Technicum on the following line:

3-layer coex blown film line
60 mm skin extruders
90 mm core layer extruder
Maxicone die head equipped with P2 gauge profile control system
280 mm die insert
HQ 1.25-2.25 mm die gap.

All extruders were equipped with LT screws. The bubble was cooled by a Multicool D tandem cooling ring assembly of which the lower one was equipped with the Optifil P2K gauge profile control system. The winding was performed by a double stationed Filmatic S winder.

All films were processed under the same conditions in terms of temperature settings.

Test Runs

In the tables the deformation rate is abbreviated $E_{avg}$; the ratio of the calculated zero shear of the skin over that of the skin is abbreviated Q; the difference in density between the core and skin layers is undedicated as $\Delta\rho$; the layer distribution is abbreviated as A/B/A and the overall thickness is shown under the heading μm. All runs were made on the Windmöller & Hölscher machine unless otherwise mentioned

TABLE 2

LD150 in core

| Run | DIE GAP mm | V0 m/min | Vf m/min | BUR | $E_{avg}$ | LD % | LD TYPE CORE | OTHER PO | Q | LLDPE TYPE SKIN | LLDPE % | $\Delta\rho$ | A/B/A | μm | Haze | Use |
|---|---|---|---|---|---|---|---|---|---|---|---|---|---|---|---|---|
| 1 | 1.4 | 4.0 | 110 | 1.67 | 2.2 | 40 | LD150 | 1018 CA | 0.56 | 1018 CA | 100 | 0.002 | .1-2-1 | 25 | 1.0 | Cling Film |
| 2 | 1.4 | 4.0 | 74 | 2.5 | 1.5 | 40 | LD150 | 1018 CA | 0.56 | 1018 CA | 100 | 0.002 | .1-2-1 | 25 | 1.6 | Stretch Film |
| 3 | 1.4 | 4.0 | 41 | 2.5 | 0.8 | 40 | LD150 | 1018 CA | 0.56 | 1018 CA | 100 | 0.002 | .1-2-1 | 45 | 5.0 | Lamination Film |
| 4-C | 1.4 | 4.0 | 27 | 2.5 | 0.5 | 40 | LD150 | 1018 CA | 0.56 | 1018 CA | 100 | 0.002 | .1-2-1 | 69 | 9.8 | Medium Duty Bags |

TABLE 2-continued

LD150 in core

| Run | DIE GAP mm | V0 m/min | Vf m/min | BUR | E$_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 5-C | 1.4 | 4.0 | 19 | 2.5 | 0.3 | 40 | LD150 | 1018 CA | 0.56 | 1018 CA | 100 | 0.002 | .1-2-1 | 97 | 16.0 | |
| 6-C | 1.4 | 4.0 | 11 | 3.8 | 0.1 | 40 | LD150 | 1018 CA | 0.56 | 1018 CA | 100 | 0.002 | .1-2-1 | 111 | 21.3 | |

Run 1 has a very low haze and is made at a very high strain rate.
Runs 4C to 6-C are comparative and show the effect of a strain rate which is too low.
The Table shows clearly that increasing the deformation rate improves the haze.

TABLE 3

LD150 in core

| Run | DIE GAP mm | V0 m/min | Vf m/min | BUR | E$_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 7 | 2.2 | 2.5 | 123 | 1.5 | 2.5 | 40 | LD150 | 1018 CA | 0.56 | 1018 CA | 100 | 0.002 | .1-2-1 | 25 | 1.4 | Cling Film |
| 8 | 2.2 | 2.5 | 88 | 2.1 | 1.8 | 40 | LD150 | 1018 CA | 0.56 | 1018 CA | 100 | 0.002 | .1-2-1 | 25 | 1.2 | Stretch Film |
| 9 | 2.2 | 2.5 | 49 | 2.1 | 1.0 | 40 | LD150 | 1018 CA | 0.56 | 1018 CA | 100 | 0.002 | .1-2-1 | 44.5 | 2.9 | Lamination Film |
| 10 | 2.2 | 2.5 | 33 | 2 | 0.6 | 40 | LD150 | 1018 CA | 0.56 | 1018 CA | 100 | 0.002 | .1-2-1 | 69 | 7.5 | Medium Duty Bags |
| 11-C | 2.2 | 2.5 | 24 | 2 | 0.4 | 40 | LD150 | 1018 CA | 0.56 | 1018 CA | 100 | 0.002 | .1-2-1 | 97 | 12.7 | |
| 12-C | 2.2 | 2.5 | 15 | 2.85 | 0.3 | 40 | LD150 | 1018 CA | 0.56 | 1018 CA | 100 | 0.002 | .1-2-1 | 111 | 21.8 | |

Runs 11-C and 12-C show the effect of a low deformation rate.

TABLE 4

LD166 and LD160AS

| Run | DIE GAP mm | V0 m/min | Vf m/min | BUR | E$_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 13 | 1.4 | 4.0 | 81 | 2.27 | 1.6 | 100 | LD166 | #N/A | 0.05 | 1018 CA | 100 | 0.004 | 1-1.5-1 | 25 | 1.5 | Non Stretch Stretch |
| 14-C | 1.4 | 4.0 | 25.7 | 2.27 | 0.4 | 100 | LD166 | #N/A | 0.05 | 1018 CA | 100 | 0.004 | 1-1.5-1 | 80 | 11.5 | Collation Shrink |
| 15-C | 1.4 | 4.0 | 16.7 | 3.5 | 0.3 | 100 | LD166 | #N/A | 0.05 | 1018 CA | 100 | 0.004 | 1-1.5-1 | 80 | 19.5 | Pallet Shrink |
| 16-C | 1.4 | 4.0 | 25.8 | 2.27 | 0.4 | 100 | LD166 | #N/A | 0.05 | 1018 CA | 100 | 0.004 | 1-3.5-1 | 80 | 8.4 | Collation Shrink |
| 17-C | 1.4 | 4.0 | 16.6 | 3.5 | 0.3 | 100 | LD166 | #N/A | 0.05 | 1018 CA | 100 | 0.004 | 1-3.5-1 | 80 | 18.5 | Pallet Shrink |
| 18-C | 1.4 | 4.0 | 18.7 | 2.5 | 0.3 | 100 | LD166 | #N/A | 0.05 | 1018 CA | 100 | 0.004 | 1-2.5-1 | 100 | 16.5 | Pallet Shrink |
| 19-C | 1.4 | 4.0 | 23.3 | 4 | 0.4 | 100 | LD166 | #N/A | 0.05 | 1018 CA | 100 | 0.004 | 1-2.5-1 | 50 | 12.7 | Collation Shrink |
| 20 | 1.4 | 4.0 | 37 | 2.5 | 0.6 | 100 | LD166 | #N/A | 0.05 | 1018 CA | 100 | 0.004 | 1-2-1 | 50 | 6.0 | Lamination Film |
| 21 | 1.4 | 4.0 | 37.1 | 2.5 | 0.7 | 100 | LD166 | #N/A | 0.05 | 1018 CA | 100 | 0.004 | 1-4-1 | 50 | 4.5 | Lamination Film |
| 22 | 1.4 | 4.0 | 37 | 2.5 | 0.7 | 100 | LD166 | #N/A | 0.05 | 1018 CA | 100 | 0.004 | 1-2.5-1 | 50 | 4.8 | Lamination Film |
| 23-C | 1.4 | 4.0 | 37 | 2.5 | 0.8 | 100 | LD160AS | NA | 2.21 | 1018 CA | 100 | 0.004 | 1-2-1 | 50 | 11.0 | |

Runs 1-C to 19-C show the effect of a deformation rate which is too low.
Run 23-C illustrates the negative effect of a high MI LDPE in the core.

TABLE 5

LD159AC

| Run | DIE GAP mm | V0 m/min | Vf m/min | BUR | E$_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 24 | 1.4 | 5.5 | 57 | 2.5 | 0.7 | 40 | LD159AC | 1018 CA | 0.68 | 1018 CA | 100 | 0.002 | 1-2-1 | 45 | 7.5 | Cling Film |
| 25 | 1.4 | 4.7 | 49 | 2.5 | 0.9 | 40 | LD159AC | 1018 CA | 0.68 | 1018 CA | 100 | 0.002 | 1-2-1 | 45 | 5.8 | Stretch |

TABLE 5-continued

LD159AC

| Run | DIE GAP mm | V0 m/min | Vf m/min | BUR | $E_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 26 | 1.4 | 4.0 | 41 | 2.5 | 0.8 | 40 | LD159AC | 1018 CA | 0.68 | 1018 CA | 100 | 0.002 | 1-2-1 | 45 | 7.0 | Lamination |
| 27-C | 1.4 | 3.0 | 31 | 2.5 | 0.6 | 40 | LD159AC | 1018 CA | 0.68 | 1018 CA | 100 | 0.002 | 1-2-1 | 45 | 9.2 | Medium Duty Bag |
| 28-C | 1.4 | 2.4 | 25 | 2.5 | 0.5 | 40 | LD159AC | 1018 CA | 0.68 | 1018 CA | 100 | 0.002 | 1-2-1 | 45 | 10.6 | |
| 29-C- | 1.4 | 2.0 | 21 | 2.5 | 0.5 | 40 | LD159AC | 1018 CA | 0.68 | 1018 CA | 100 | 0.002 | 1-2-1 | 45 | 10.5 | |
| 30 | 1.4 | 4.0 | 110 | 1.67 | 2.2 | 40 | LD159AC | 1018 CA | 0.68 | 1018 CA | 100 | 0.002 | 1-2-1 | 25 | 1.2 | Cling Film |
| 31 | 1.4 | 4.0 | 74 | 2.5 | 1.5 | 40 | LD159AC | 1018 CA | 0.68 | 1018 CA | 100 | 0.002 | 1-2-1 | 25 | 1.9 | Stretch |
| 32 | 1.4 | 4.0 | 41 | 2.5 | 0.8 | 40 | LD159AC | 1018 CA | 0.68 | 1018 CA | 100 | 0.002 | 1-2-1 | 45 | 7.0 | Lamination |
| 33-C | 1.4 | 4.0 | 27 | 2.5 | 0.5 | 40 | LD159AC | 1018 CA | 0.68 | 1018 CA | 100 | 0.002 | 1-2-1 | 69 | 13.2 | Medium Duty Bag |
| 34-C | 1.4 | 4.0 | 19 | 2.5 | 0.3 | 40 | LD159AC | 1018 CA | 0.68 | 1018 CA | 100 | 0.002 | 1-2-1 | 97 | 20.2 | |
| 35-C | 1.4 | 4.0 | 11 | 3.8 | 0.1 | 40 | LD159AC | 1018 CA | 0.68 | 1018 CA | 100 | 0.002 | 1-2-1 | 111 | 25.5 | |

Runs 28-C, 29-C, 33-C to 35-C show the effect of a low deformation rate.
Run 30 shows the beneficial effect of a very high deformation rate.
Run 27 is a borderline result with a border line deformation rate.

TABLE 6

LD166BA, LD165BW or NX00328 in core layer

| Run | DIE GAP mm | V0 m/min | Vf m/min | BUR | $E_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 36 | 1.4 | 4.0 | 50 | 2.5 | 0.88 | 100 | LD166BA | NA | 0.05 | 1018 CA | 100 | 0.004 | 1-2-1 | 40 | 4.6 | Collation Shrink |
| 37 | 1.4 | 4.0 | 61.5 | 2.5 | 1.20 | 100 | LD165BW | NA | 0.07 | 1018 CA | 100 | 0.004 | 1-2-1 | 30 | 3.8 | Collation Shrink |
| 38 | 1.4 | 4.0 | 92.4 | 2.5 | 1.84 | 100 | LD150BW | NA | 0.24 | 1018 CA | 100 | 0.005 | 1-2-1 | 20 | 3.3 | Stretch Film |
| 39-C | 1.4 | 3.6 | 166 | 2.5 | 4.19 | 100 | LD100BW | NA | 0.75 | 1018 CA | 100 | 0.004 | 1-2-1 | 9 | 3.4 | Overwrap Film |
| 40 | 1.4 | 4.0 | 37 | 2.5 | 0.69 | 80 | LD165BW | 1018 CA | 0.12 | 1018CA | 100 | 0.003 | 1-2-1 | 50 | 5.5 | Collation Shrink |
| 41-C | 1.4 | 4.0 | 37 | 2.5 | 0.69 | 80 | LD165BW | 1018 CA | 0.06 | 2018CA | 100 | 0.003 | 1-2-1 | 50 | 10.3 | |
| 42A-C | 1.4 | 4.0 | 37 | 2.5 | 0.69 | 80 | LD165BW | 1018 CA | 0.10 | 1327CA | 100 | −0.006 | 1-2-1 | 50 | 26.7 | |
| 42B | 1.4 | 4.0 | 105 | 2 | 2.10 | 100 | NX00328 | NA | 0.10 | 1327CA | 100 | 0.001 | 1/2/1 | 20 | 5.4 | Collation Shrink |
| 43 | 1.4 | 4.0 | 37 | 2.5 | 0.69 | 80 | LD166BA | 1018 CA | 0.14 | LL1001XV | 100 | 0.004 | 1-2-1 | 50 | 4.2 | Heavy Gauge Stretch |

Run 39 reflects a favorable outcome due to a balance of a high deformation rate which promotes good haze and a high MI LDPE in the core layer which tends to worsen the haze. In other words the haze is better than it otherwise would have been due to the high deformation rate.
Run 41-C shows the negative outcome when a high MI LLDPE is used in combination with a relatively low deformation rate.
Run 42A-C shows the increase in haze when the density of the skin layer is formulated to be higher than that of the core layer.
Run 42B shows the contrast when a higher deformation rate is used as well as a higher density core layer.
The small differences influence the haze disproportionately.

TABLE 7

LD150BW in core

| Run | DIE GAP mm | V0 m/min | Vf m/min | BUR | $E_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 44 | 1.4 | 4.0 | 73.8 | 2.5 | 1.46 | 80 | LD150BW | 1018 CA | 0.34 | 1018CA | 95 | 0.004 | 1-2-1 | 25 | 1.8 | Stretch Film |
| 45 | 1.4 | 4.0 | 73.8 | 2.5 | 1.46 | 80 | LD150BW | 1018 CA | 0.32 | 1018CA | 100 | 0.004 | 1-2-1 | 25 | 2.0 | Stretch Film |
| 46 | 1.4 | 4.0 | 123 | 2.5 | 2.48 | 80 | LD150BW | 1018 CA | 0.47 | LL1001XV | 100 | 0.004 | 1-2-1 | 15 | 1.6 | Stretch Film |
| 47 | 1.4 | 4.0 | 92.3 | 2.5 | 1.84 | 80 | LD150BW | 1018 CA | 0.47 | LL1001XV | 100 | 0.004 | 1-2-1 | 20 | 2.2 | Stretch Film |
| 48 | 1.4 | 4.0 | 92.3 | 2.5 | 1.84 | 80 | LD150BW | 1018 CA | 0.47 | LL1001XV | 100 | 0.004 | 1-2-1 | 20 | 1.9 | Stretch Film |
| 49 | 1.4 | 4.0 | 92.3 | 2.5 | 1.84 | 100 | LD150BW | NA | 0.33 | 1018CA | 100 | 0.005 | 1-2-1 | 20 | 3.3 | Stretch Film |
| 50 | 1.4 | 4.0 | 97.1 | 2.5 | 1.94 | 100 | LD150BW | NA | 0.33 | 1012CA | 100 | 0.011 | 1-2-1 | 19 | 1.1 | Stretch Film |
| 51 | 1.4 | 4.0 | 68.3 | 2.5 | 1.34 | 60 | LD150BW | PP4352F1 | 0.24 | 1018CA | 100 | 0.005 | 1-2-1 | 27 | 2.6 | Bread Bags |
| 52 | 1.4 | 4.0 | 71 | 2.5 | 1.40 | 20 | LD150BW | PP4352F1 | 0.24 | 1018CA | 100 | 0.005 | 1-2-1 | 26 | 2.7 | Bread Bags |

TABLE 7-continued

LD150BW in core

| Run | DIE GAP mm | V0 m/min | Vf m/min | BUR | $E_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 53 | 1.4 | 4.0 | 71 | 2.5 | 1.40 | 60 | LD150BW | HTA108 | 0.24 | 1018CA | 100 | 0.005 | 1-2-1 | 26 | 2.2 | Bead Bags |
| 54 | 1.4 | 4.0 | 68.3 | 2.5 | 1.34 | 20 | LD150BW | HTA108 | 0.24 | 1018CA | 100 | 0.005 | 1-2-1 | 27 | 4.1 | Bread Bags |

Runs 75 and 76 contain core layers with a large amount of other compatible polypropylene.
The density difference is calculated by reference to the ethylene based polymers only. It can be seen that the even though there is a negative density difference for the non-ethylene based polypropylene polymer, its crystallization behavior at high deformation rates provides a similar effect as higher densities polyethylene based core compositions.

TABLE 8

LD165BW and LD166BA

| Run | DIE GAP mm | V0 m/min | Vf m/min | BUR | $E_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 55 | 1.4 | 4.0 | 71 | 2.5 | 1.40 | 40 | LD165BW1 | 1327CA | 0.38 | 1018CA | 100 | 0.007 | 1-2-1 | 26 | 1.6 | Collation Shrink |
| 56 | 1.4 | 4.0 | 71 | 2.5 | 1.40 | 40 | LD165BW1 | 27H07AX | | 1018CA | | 0.007 | 1-2-1 | 26 | 1.7 | Collation Shrink |
| 57 | 1.4 | 4.0 | 123 | 2.5 | 2.48 | 40 | LD165BW1 | 27H07AX | | 1018CA | | 0.007 | 1-2-1 | 15 | 1.1 | Collation Shrink |
| 58-C | 1.4 | 4.0 | 14.6 | 3.8 | 0.22 | 80 | LD166BA | 1018CA | 0.09 | 1018CA | 100 | 0.004 | 1-2-1 | 83 | 28.8 | Pallet Shrink |
| 59-C | 1.4 | 4.0 | 11.9 | 3.8 | 0.17 | 80 | LD166BA | 1018CA | 0.09 | 1018CA | 100 | 0.004 | 1-2-1 | 102 | 31.7 | Pallet Shrink |

Runs 58-C and 59-C show the effect of the low deformation rate.
Runs 56 and 57 show that a homogeneously branched mLLDPE can be combined with an LDPE in the core layer to provide low haze values.

TABLE 9

Varying MI of the LDPE in the core layer

| Run | DIE GAP mm | V0 m/min | Vf m/min | BUR | $E_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 60 | 1.4 | 4.8 | 44 | 2.5 | 0.82 | 20 | LD165BW1 | 1018CA | 0.59 | 1018CA | 100 | 0.001 | 1-2-1 | 50 | 5.8 | A) |
| 61-C | 1.4 | 4.8 | 44 | 2.5 | 0.82 | 20 | LD185BW | 1018CA | 0.94 | 1018CA | 100 | 0.001 | 1-2-1 | 50 | 8.4 | A) |
| 62 | 1.4 | 4.8 | 44 | 2.5 | 0.82 | 20 | NX00328 | 1018CA | 0.65 | 1018CA | 100 | 0.002 | 1-2-1 | 50 | 5.9 | A) |
| 64 | 1.4 | 4.8 | 44 | 2.5 | 0.82 | 80 | LD165BW1 | 1018CA | 0.12 | 1018CA | 100 | 0.003 | 1-2-1 | 50 | 5.5 | A) |
| 65-C | 1.4 | 4.8 | 44 | 2.5 | 0.82 | 80 | LD185BW | 1018CA | 0.79 | 1018CA | 100 | 0.004 | 1-2-1 | 50 | 8.5 | Lamination |
| 66 | 1.4 | 4.8 | 44 | 2.5 | 0.82 | 80 | NX00328 | 1018CA | 0.18 | 1018CA | 100 | 0.008 | 1-2-1 | 50 | 5.4 | A) |
| 68 | 1.4 | 4.8 | 44 | 2.5 | 0.82 | 40 | LD165BW1 | 1018CA | 0.35 | 1018CA | 100 | 0.002 | 1-2-1 | 50 | 5.3 | A) |
| 69-C | 1.4 | 4.8 | 44 | 2.5 | 0.82 | 40 | LD185BW | 1018CA | 0.89 | 1018CA | 100 | 0.002 | 1-2-1 | 50 | 9.1 | Lamination |
| 70 | 1.4 | 4.8 | 44 | 2.5 | 0.82 | 40 | NX00328 | 1018CA | 0.42 | 1018CA | 100 | 0.004 | 1-2-1 | 50 | 5.7 | A) |
| 72 | 1.4 | 4.8 | 44 | 2.5 | 0.82 | 60 | LD165BW1 | 1018CA | 0.20 | 1018CA | 100 | 0.002 | 1-2-1 | 50 | 5.5 | A) |
| 73-C | 1.4 | 4.8 | 44 | 2.5 | 0.82 | 60 | LD185BW | 1018CA | 0.84 | 1018CA | 100 | 0.003 | 1-2-1 | 50 | 9.2 | Lamination |
| 74 | 1.4 | 4.8 | 44 | 2.5 | 0.82 | 60 | NX00328 | 1018CA | 0.27 | 1018CA | 100 | 0.006 | 1-2-1 | 50 | 5.2 | A) |
| 76 | 1.4 | 4.8 | 44 | 2.5 | 0.82 | 50 | LD156BW | 1018CA | 0.52 | 1018CA | 100 | 0.004 | 1-2-1 | 50 | 6.7 | A) |
| 77-C | 1.4 | 4.8 | 44 | 2.5 | 0.82 | 0 | | 1018CA | 1.00 | 1018CA | 100 | 0.000 | 1-2-1 | 50 | 20.3 | |
| 78-C | 1.4 | 4.8 | 44 | 2.5 | 0.82 | 80 | LD185BW | 1018CA | 0.82 | 1018CA | 90 | 0.922 | 1-2-1 | 50 | 8.5 | Lamination |
| 79 | 1.4 | 4.8 | 44 | 2.5 | 0.82 | 80 | NX00328 | 1018CA | 0.22 | 1018CA | 90 | 0.926 | 1-2-1 | 50 | 5.4 | A) |
| 80 | 1.4 | 4.8 | 44 | 2.5 | 0.82 | 80 | LD166BA | 1018CA | 0.09 | 1018CA | 100 | 0.004 | 1-2-1 | 50 | 4.3 | A) |
| 81-C | 1.4 | 4.8 | 44 | 2.5 | 0.82 | 80 | LD160AS | 1018CA | 1.88 | 1018CA | 100 | 0.004 | 1-2-1 | 50 | 11.0 | Lamination |

Uses marked A) are for collation shrink.
The MI of the core LDPE is too high in runs 61-C, 65-C, 69-C, 73-C, 78-C and 81-C. Run 77-C shows what happens absent an LDPE in the core.

TABLE 10

LD185BW and LD165BW in the core

| Run | DIE GAP mm | V0 m/min | Vf m/min | BUR | $E_{avg}$ | LD % | LD TYPE CORE | OTHER PO | Q | LLDPE TYPE SKIN | LLDPE % | Δρ | A/B/A | μm | Haze |
|---|---|---|---|---|---|---|---|---|---|---|---|---|---|---|---|
| 82 | 1.4 | 4.0 | 37 | 2.5 | 0.69 | 100 | LD165BW1 | NA | 0.07 | 1018CA | 95 | 0.004 | 1-2-1 | 50 | 2.7 |
| 83 | 1.4 | 4.0 | 37 | 2.5 | 0.69 | 80 | LD165BW1 | 1018CA | 0.12 | 1018CA | 95 | 0.003 | 1-2-1 | 50 | 2.5 |
| 84 | 1.4 | 4.0 | 37 | 2.5 | 0.69 | 0 |  | 20HX10AX 100 wt % |  | 1018CA | 95 | 0.002 | 1-2-1 | 50 | 6.2 |
| 85 | 1.4 | 4.0 | 37 | 2.5 | 0.69 | 40 | LD165BW1 | 20HX10AX | 0.07 | 1018CA | 95 | 0.003 | 1-2-1 | 50 | 3.9 |
| 86-C | 1.4 | 4.0 | 37 | 2.5 | 0.69 | 80 | LD185BW | 1018CA + 1.6% MB | 0.79 | 1018CA | 98.4 | 0.004 | 1-2-1 | 50 | 8.5 |
| 87-C | 1.4 | 4.0 | 37 | 2.5 | 0.69 | 60 | LD185BW | 1018CA + 1.6% MB | 0.84 | 1018CA | 98.4 | 0.003 | 1-2-1 | 50 | 9.2 |
| 88-C | 1.4 | 4.0 | 37 | 2.5 | 0.69 | 40 | LD185BW | 1018CA + 1.6% MB | 0.89 | 1018CA | 98.4 | 0.002 | 1-2-1 | 50 | 9.1 |
| 89-C | 1.4 | 4.0 | 37 | 2.5 | 0.69 | 20 | LD185BW | 1018CA + 1.6% MB | 0.94 | 1018CA | 98.4 | 0.001 | 1-2-1 | 50 | 8.4 |
| 90-C | 1.4 | 4.0 | 37 | 2.5 | 0.69 | 0 |  | 1018CA + 1.6% MB | 1.00 | 1018CA | 98.4 | 0.000 | 1-2-1 | 50 | 20.3 |

Runs 86-C to 89C show the negative effect on haze when an LDPE is used in the core with an MI which is too high.
Run 90-C again shows the effect of the absence of an LDPE in the core layer.
Runs 84 and 85 employ a homogeneously branched mLLDPE in the core layer.
An improvement in haze is achieved with LDPE used combination with the homogeneously branched mLLDPE.

TABLE 11

LD165BW and LD166BA in the core layer

| Run | DIE GAP mm | V0 m/min | Vf m/min | BUR | $E_{avg}$ | LD % | LD TYPE CORE | OTHER PO | Q | LLDPE TYPE SKIN | LLDPE % | Δρ | A/B/A | μm | Haze | Use |
|---|---|---|---|---|---|---|---|---|---|---|---|---|---|---|---|---|
| 91 | 2.2 | 4.9 | 64.4 | 3.5 | 0.99 | 40 | LD165BW1 | 1018CA | 0.35 | 1018CA | 99 | 0.002 | 1/2/1 | 40 | 3.6 | Lamination |
| 92 | 2.2 | 5.2 | 67.2 | 3.5 | 1.03 | 40 | LD165BW1 | 1018CA | 0.40 | 1018CA | 94 | 0.001 | 1/2/1 | 40 | 2.7 | Lamination |
| 93 | 2.2 | 5.5 | 73.7 | 3.5 | 1.14 | 40 | LD165BW1 | 1018CA | 0.40 | 1018CA | 94 | 0.001 | 1/3/1 | 40 | 2.5 | Lamination |
| 94 | 2.2 | 5.8 | 78 | 3.5 | 1.20 | 40 | LD165BW1 | 1018CA | 0.40 | 1018CA | 94 | 0.001 | 1/3/1 | 40 | 4.2 | Lamination |
| 95 | 2.2 | 5.9 | 78.3 | 3.5 | 1.21 | 40 | LD165BW1 | 1018CA | 0.45 | 1018EB | 89 | 0.001 | 1/3/1 | 40 | 4.9 | Lamination |
| 96 | 2.2 | 5.9 | 78.4 | 3.5 | 1.21 | 60 | LD165BW1 | 1018CA | 0.21 | 1018EB | 99 | 0.002 | 1/2/1 | 40 | 3.3 | Lamination |
| 97 | 2.2 | 6.0 | 80.5 | 3.5 | 1.24 | 80 | LD165BW1 | 1018CA | 0.12 | 1018EB | 99 | 0.003 | 1/2/1 | 40 | 3.9 | Lamination |
| 98 | 2.2 | 6.1 | 80.8 | 3.5 | 1.25 | 80 | LD165BW1 | 1018CA | 0.14 | 1018EB | 94 | 0.003 | 1/2/1 | 40 | 4.1 | Lamination |
| 99 | 2.2 | 6.1 | 81.5 | 3.5 | 1.26 | 80 | LD165BW1 | 1018CA | 0.14 | 1018EB | 94 | 0.003 | 1/3/1 | 40 | 3.4 | Lamination |
| 101-C | 1.4 | 4.0 | 73.8 | 2.5 | 1.46 | 0 |  | EXP502 |  | 1018CA | 100 | 0.002 | 1/2/1 | 25 | 16.5 | Stretch |
| 102 | 1.4 | 4.0 | 73.8 | 2.5 | 1.46 | 10 | LD166BA | EXP502 |  | 1018CA | 100 | 0.002 | 1/2/1 | 25 | 3.2 | Stretch |

Runs 91 to 99 were executed on the Lengerich machine.
Run 101-C again shows the effect of not using LDPE in the core but using a homogeneously branched mLLDPE.
Run 102 emphasizes that a small amount of LDPE is sufficient to at higher deformation rates to greatly improve the haze.

The invention claimed is:

1. A method for determining process conditions for a blown film coextrusion process, said coextrusion process comprising:

A) coextruding a film having a core layer and a pair of core contact layers adjacent both sides of the core layer through a die exit at a linear speed $V_o$ cm/s; and cooling, orienting and crystallizing the multi-layer film formed until a frost line is reached at a distance FLH from the die exit by withdrawing the film at a take up speed $V_f$ in cm/s; the core contact layers having a composition of at least 90 wt % of ethylene based polymer of which at least 75 wt % is a linear polyethylene with an $I_{2.16\ linear\ pe\text{-}skin}$ of 2.5 g/10 min or less and the core layer having a composition of at least 90 wt % of ethylene based polymer or other compatible linear olefin based polymer of which at least 5 wt % is an LDPE with a $I_{2.16\ ldpe\text{-}core}$ of 1.5 g/10 min or less;

and said method comprising:

B) subsequently increasing the deformation rate $E_{avg}=(V_f-V_o)/FLH$ to a level above at least 0.5 s$^{-1}$ to lower the haze value; and wherein the linear polyethylene of the core contact layers contain an LLDPE and at least 60 wt % of an mLLDPE based on the total weight of the linear polyethylene.

2. The method according to claim 1 in which the compositions are further adjusted by:

iv) increasing the average density of ethylene based polymer in the core layer or layers above that of the ethylene based polymer of the skin layers.

3. The method according to claim 1 in which one or both core contact layers is a skin layer forming one surface or are skin layers forming both film surfaces.

4. The method according to claim 1 in which the $E_{avg}>0.14a^2+0.025a+0.64$ wherein a $I_{2.16\ Idpe\text{-}core}$ and the film has a haze of less than 6 as determined by a method based on ASTM D-1003 described herein.

5. The method according to claim 1 in which the core layer composition contains no or less than 4 wt % of a linear polyolefin other than linear polyethylene and/or contains no or less than 4 wt % of a heterogeneously branched ethylene polymer other than LDPE.

6. The method according to claim 1 in which the core contact layers contain at least 95 wt %, of linear polyethylene.

7. The method according to claim 1 in which the core contact layers contain no or less than 2 wt % of an ethylene based polymer containing polar moieties and/or contain no or less than 5 wt % of a substantially homogenously branched linear polyethylene.

8. The method according to claim 1 in which the core contact layer composition contains at least 90 wt % of linear polyethylene and the core layer contains less than 10 wt % of the LDPE having a $I_{2.16\ Idpe\text{-}core}$ of 1.5 g/10 min or less.

* * * * *